(12) United States Patent
Togashi et al.

(10) Patent No.: US 8,659,873 B2
(45) Date of Patent: Feb. 25, 2014

(54) MULTILAYER CAPACITOR

(75) Inventors: Masaaki Togashi, Tokyo (JP); Takashi Aoki, Tokyo (JP)

(73) Assignee: TDK Corporation, Tokyo (JP)

( * ) Notice: Subject to any disclaimer, the term of this patent is extended or adjusted under 35 U.S.C. 154(b) by 164 days.

(21) Appl. No.: 13/447,668

(22) Filed: Apr. 16, 2012

(65) Prior Publication Data

US 2012/0200983 A1   Aug. 9, 2012

Related U.S. Application Data

(62) Division of application No. 12/497,970, filed on Jul. 6, 2009, now Pat. No. 8,189,321.

(30) Foreign Application Priority Data

Sep. 30, 2008  (JP) ................................. 2008-254952
Oct. 10, 2008  (JP) ................................. 2008-264125
Oct. 20, 2008  (JP) ................................. 2008-270093

(51) Int. Cl.
    *H01G 4/228*  (2006.01)
(52) U.S. Cl.
    USPC .................. 361/306.3; 361/306.1; 361/321.1; 361/321.2; 361/305; 361/308.1
(58) Field of Classification Search
    USPC ........... 361/306.3, 303–305, 308.1, 311–313, 361/306.1, 321.1, 321.2
    See application file for complete search history.

(56) References Cited

U.S. PATENT DOCUMENTS

| | | | |
|---|---|---|---|
| 6,577,491 B1 | 6/2003 | Ohtsuka et al. | |
| 6,819,543 B2 * | 11/2004 | Vieweg et al. | 361/306.3 |
| 6,940,708 B2 | 9/2005 | Yoshii et al. | |
| 7,046,500 B2 | 5/2006 | Lee et al. | |
| 7,224,570 B2 * | 5/2007 | Yamaguchi et al. | 361/305 |
| 7,319,582 B2 * | 1/2008 | Takashima et al. | 361/303 |
| 7,436,650 B2 * | 10/2008 | Oguni et al. | 361/321.2 |
| 7,636,230 B2 | 12/2009 | Aoki | |
| 7,916,451 B2 * | 3/2011 | Randall et al. | 361/321.4 |
| 8,107,214 B2 * | 1/2012 | Aoki | 361/303 |

FOREIGN PATENT DOCUMENTS

JP    A-2003-168620    6/2003

* cited by examiner

*Primary Examiner* — Nguyen T Ha
(74) *Attorney, Agent, or Firm* — Oliff PLC

(57) ABSTRACT

A first inner electrode is integrally provided with a first terminal connection part connected to a first terminal electrode and a first linking connection part connected to a first linking electrode. A second inner electrode is integrally provided with a second terminal connection part connected to a second terminal electrode and a second linking connection part connected to a second linking electrode. A third inner electrode is integrally provided with a third linking connection part connected to the first linking electrode. A fourth inner electrode is integrally provided with a fourth linking connection part connected to the second linking electrode. The third inner electrode is adjacent to the first and fourth inner electrodes in a laminating direction of the plurality of dielectric layers. The first and fourth inner electrodes overlap the third inner electrode as seen in the laminating direction of the plurality of dielectric layers.

13 Claims, 18 Drawing Sheets

MULTILAYER CAPACITOR

This is a Divisional of application Ser. No. 12/497,970 filed Jul. 6, 2009. The disclosure of the prior application is hereby incorporate by reference herein in its entirety.

BACKGROUND OF THE INVENTION

1. Field of the Invention

The present invention relates to a multilayer capacitor.

2. Related Background Art

Multilayer capacitors made applicable to various uses by increasing their equivalent series resistance (ESR) so as to suppress voltage oscillations in power supplies have conventionally been known (see, for example, the following Patent Literature 1). Such a multilayer capacitor comprises a multilayer body exhibiting a rectangular parallelepiped form and having a pair of main faces opposing each other, first and second side faces opposing each other, and third and fourth side faces opposing each other; a first terminal electrode arranged on the first side face; a second terminal electrode arranged on the second side face; a first linking electrode arranged on the third side face; and a second linking electrode arranged on the fourth side face. The multilayer body is formed by laminating first to fourth inner electrodes alternately with dielectric layers.

The first inner electrode is integrally provided with a terminal projection extending such that one end portion thereof is exposed at the first side face so as to connect with the first terminal electrode and a connecting projection extending such that one end portion thereof is exposed at the third side face so as to connect with the first linking electrode (see FIG. 10 of the following Patent Literature). The second inner electrode is integrally provided with a terminal projection connected to the second terminal electrode so as to expose one end portion at the second side face and a connecting projection extending such that one end portion thereof is exposed at the fourth side face so as to connect with the second linking electrode (see the same figure). The third inner electrode is integrally provided with a connecting projection extending such that one end portion thereof is exposed at the third side face so as to connect with the first linking electrode (see the same figure). The fourth inner electrode is integrally provided with a connecting projection extending such that one end portion thereof is exposed at the fourth side face so as to connect with the second linking electrode (see the same figure). Therefore, a current flows through the first terminal electrode, first inner electrode, first linking electrode, and third inner electrode in this order, while the first and third inner electrodes function as those homopolar with each other. The current also flows through the fourth inner electrode, second linking electrode, second inner electrode, and second terminal electrode in this order, while the second and fourth inner electrodes function as those homopolar with each other. As a consequence, current flow paths increase in the multilayer capacitor, thereby enhancing the ESR of the multilayer capacitor. Thus enhancing the ESR can increase impedance, thereby reducing impedance fluctuations over a broad bandwidth centered at a resonance frequency.

Patent Literature 1: Japanese Patent Application Laid-Open No. 2003-168620

SUMMARY OF THE INVENTION

In the conventional multilayer capacitors such as the one in accordance with the above-mentioned Patent Literature 1, however, there are cases where the impedance still decreases near a resonance point frequency even when the resonance frequency is enhanced by increasing the ESR (see a broken line b in FIG. 3).

It is therefore an object of the present invention to provide a multilayer capacitor which can inhibit the impedance from decreasing near the resonance frequency.

The inventors conducted diligent studies concerning causes by which the impedance decreases near the resonance frequency. As a result, the following have been found.

In the multilayer capacitor disclosed in the above-mentioned Patent Literature 1, the first inner electrode integrally provided with the connecting projection connected to the first terminal electrode and the second inner electrode integrally provided with the connecting projection connected to the second terminal electrode are adjacent to each other through a dielectric layer. That is, the first and second inner electrodes, which are heteropolar to each other, are adjacent to each other through the dielectric layer. Therefore, a capacitance occurs between the first and second inner electrodes.

Meanwhile, a current flows through the terminal projection, first inner electrode, and connecting projection in this order in the first inner electrode, and through the connecting projection, second inner electrode, and terminal projection in this order in the second inner electrode. Therefore, a resistance component occurs among the terminal projection, first inner electrode, and connecting projection through which the current flows in the first inner electrode, and among the terminal projection, second inner electrode, and connecting projection in the second inner electrode. Thus, in an equivalent circuit of the multilayer capacitor, a capacitance (also referred to as parasitic capacitance) Cp occurring between a part of the first inner electrode opposite from a part between the terminal electrode projection and connecting projection and a part of the second inner electrode between the terminal projection and connecting projection is connected in parallel to a resistance component ESR of the multilayer capacitor (see FIG. 4). The inventors have found that the impedance near the resonance frequency becomes lower as the parasitic capacitance Cp is greater and completed the present invention according to this finding.

Hence, in one aspect, the present invention provides a multilayer capacitor comprising a matrix constituted by a plurality of laminated dielectric layers, first and second terminal electrodes arranged on an outer surface of the matrix, first and second linking electrodes arranged on the outer surface of the matrix, and first and second inner electrodes arranged within the matrix while being separated from each other in a laminating direction of the dielectric layers; wherein the first inner electrode is integrally provided with a first terminal connection part connected to the first terminal electrode and a first linking connection part connected to the first linking electrode; wherein the second inner electrode is integrally provided with a second terminal connection part connected to the second terminal electrode and a second linking connection part connected to the second linking electrode; wherein the first inner electrode has a first terminal-side region located closer to the first terminal connection part than is a portion provided with the first linking connection part and a first opposite-side region located closer to an opposite side of the first terminal connection part than is the portion provided with the first linking connection part; wherein the second inner electrode has a second terminal-side region located closer to the second terminal connection part than is a portion provided with the second linking connection part and a second opposite-side region located closer to an opposite side of the second terminal connection part than is the portion provided with the second linking connection part; wherein the first terminal-side region and the second opposite-side region overlap each other as seen in the laminating direction of the dielectric layers; wherein the first opposite-side region and the second terminal-side region overlap each other as seen in the laminating direction of the dielectric layers; wherein the first terminal-side region has an area smaller than that of the second opposite-side region; and wherein the second terminal-side region has an area smaller than that of the first opposite-side region.

In the multilayer capacitor in accordance with this aspect of the present invention, the first inner electrode has the first terminal-side region located closer to the first terminal connection part than is the portion provided with the first linking connection part and the first opposite-side region located closer to the opposite side of the first terminal connection part than is the portion provided with the first linking connection part, while the second inner electrode has the second terminal-side region located closer to the second terminal connection part than is the portion provided with the second linking connection part and the second opposite-side region located closer to the opposite side of the second terminal connection part than is the portion provided with the second linking connection part. Also, in the multilayer capacitor in accordance with this aspect of the present invention, the first terminal-side region and the second opposite-side region overlap each other as seen in the laminating direction of the dielectric layers, the first opposite-side region and the second terminal-side region overlap each other as seen in the laminating direction of the dielectric layers, the first terminal-side region has an area smaller than that of the second opposite-side region, and the second terminal-side region has an area smaller than that of the first opposite-side region. This reduces the opposing area of the first terminal-side region and second opposite-side region where the resistance component ESR (see FIG. 4) of the multilayer capacitor occurs when a current flows and the opposing area of the second terminal-side region and first opposite-side region where the resistance component ESR (see FIG. 4) of the multilayer capacitor occurs when the current flows, thereby lowering the parasitic capacitance Cp (see FIG. 4) connected in parallel to the resistance component of the multilayer capacitor. As a result, as illustrated by a solid line a in FIG. 3, the impedance can be inhibited from decreasing near the resonance frequency, whereby impedance fluctuations are suppressed over a broad bandwidth including the vicinity of the resonance frequency.

Preferably, each of the first and second terminal-side regions is provided with a plurality of openings.

More preferably, the plurality of openings are arranged such as to form a mesh.

More preferably, the plurality of openings are formed like elongated holes, the opening provided in the first terminal-side region in the plurality of openings is arranged such that a longitudinal direction thereof extends in an aligning direction of the first terminal-side region and first opposite-side region, and the opening provided in the second terminal-side region in the plurality of openings is arranged such that a longitudinal direction thereof extends in an aligning direction of the second terminal-side region and second opposite-side region.

For reducing the opposing area of the first terminal-side region and second opposite-side region and the opposing area of the second terminal-side region and first opposite-side region, the first and second terminal-side regions may be formed into a single thin line, for example. In this case, however, a current flows through the single thin line part in a concentrated manner, thereby increasing equivalent series inductance (ESL). The ESL is connected in series to the capacitance C in the equivalent circuit of the multilayer capacitor (see FIG. 4) and acts to deter the capacitor from being rapidly charged and discharged. Therefore, the circuit is inhibited from speeding up as the ESL increases. When a plurality of openings are provided in the first and second terminal-side regions such as to form a mesh (net) or elongated holes (slits) as mentioned above, by contrast, the current flows in a dispersive manner through the first and second terminal-side regions, thereby lowering the ESL. As a result, the impedance can be decreased over the whole high-frequency band as illustrated by a dash-single-dot line c1 in FIG. 3.

Preferably, the multilayer capacitor comprises third and fourth inner electrodes arranged within the matrix while being separated from each other in the laminating direction of the dielectric layers, the third inner electrode is integrally provided with a third linking connection part connected to the first linking electrode, the fourth inner electrode is integrally provided with a fourth linking connection part connected to the second linking electrode, the third inner electrode is adjacent to the second inner electrode through the dielectric layer, the fourth inner electrode is adjacent to the first inner electrode through the dielectric layer, the first terminal-side region and the first opposite-side region overlap the fourth inner electrode as seen in the laminating direction of the dielectric layers, and the second terminal-side region and the second opposite-side region overlap the third inner electrode as seen in the laminating direction of the dielectric layers. In this case, capacitances occur in the part where the first opposite-side region and the fourth inner electrode overlap each other and in the part where the second opposite-side region and the third inner electrode overlap each other. This can increase the total capacitance of the multilayer capacitor. As a result, the impedance can be decreased over the whole low-frequency band as illustrated by a dash-double-dot line c2 in FIG. 3.

Preferably, the multilayer capacitor comprises third and fourth inner electrodes arranged within the matrix while being separated from each other in the laminating direction of the dielectric layers, the third inner electrode is integrally provided with a third linking connection part connected to the first linking electrode, the fourth inner electrode is integrally provided with a fourth linking connection part connected to the second linking electrode, the third and fourth inner electrodes are positioned between the first and second inner electrodes within the matrix, the third inner electrode is adjacent to the first inner electrode through the dielectric layer, the fourth inner electrode is adjacent to the second inner electrode through the dielectric layer, the first terminal-side region and the first opposite-side region overlap the third inner electrode as seen in the laminating direction of the dielectric layers, and the second terminal-side region and the second opposite-side region overlap the fourth inner electrode as seen in the laminating direction of the dielectric layers. In this case, the first inner electrode electrically connected to the first terminal electrode is not adjacent to the second and fourth inner electrodes, which are heteropolar thereto, in the laminating direction, while the second inner electrode electrically connected to the second terminal electrode is not adjacent to the first and third inner electrodes, which are heteropolar thereto, in the laminating direction. Therefore, the presence of the third inner electrode, which is homopolar with the first inner electrode connected to the first terminal electrode, keeps the first inner electrode from opposing the heteropolar fourth inner electrode in a neighboring manner in the laminating direction, while the presence of the fourth inner electrode, which is homopolar with the second inner electrode connected to the second terminal electrode, keeps the second inner electrode from opposing the heteropolar third inner electrode in a neighboring manner in the laminating direction. As a result, the parasitic capacitance can further be lowered.

In another aspect, the present invention provides a multilayer capacitor comprising a matrix constituted by a plurality of laminated dielectric layers having at least first to third dielectric layers, first and second terminal electrodes arranged on an outer surface of the matrix, first and second linking electrodes arranged on the outer surface of the matrix, and first to fourth inner electrodes arranged within the matrix; wherein the first, second, and third dielectric layers are laminated in succession; wherein the first and second inner electrodes are arranged on the first dielectric layer while being separated from each other; wherein the third inner electrode is arranged on the second dielectric layer; wherein the fourth inner electrode is arranged on the third dielectric layer; wherein the first inner electrode is integrally provided with a first terminal connection part connected to the first terminal electrode and a first linking connection part connected to the first linking electrode; wherein the second inner electrode is integrally provided with a second terminal connection part connected to the second terminal electrode and a second linking connection part connected to the second linking electrode; wherein the third inner electrode is integrally provided with a third linking connection part connected to the second linking electrode; wherein the fourth inner electrode is integrally provided with a fourth linking connection part connected to the first linking electrode; wherein the third inner electrode is adjacent to the second and fourth inner electrodes in a laminating direction of the plurality of dielectric layers; wherein the first and third inner electrodes are kept from overlapping each other as seen in the laminating direction of the plurality of dielectric layers; and wherein the second, third, and fourth inner electrodes overlap one another as seen in the laminating direction of the plurality of dielectric layers.

In the multilayer capacitor in accordance with this aspect of the present invention, the first inner electrode is integrally provided with the first terminal connection part connected to the first terminal electrode and the first linking connection part connected to the first linking electrode, the third inner electrode is integrally provided with the third linking connection part connected to the second linking electrode, the fourth inner electrode is integrally provided with the fourth linking connection part connected to the first linking electrode, the first and fourth inner electrodes, which are homopolar with each other, overlap each other as seen in the laminating direction of the plurality of dielectric layers, and the first and third inner electrodes are kept from overlapping each other as seen in the laminating direction of the plurality of dielectric layers. Therefore, the first inner electrode in which the resistance component ESR (see FIG. 4) of the multilayer capacitor occurs when a current flows does not oppose any heteropole in a neighboring manner on the fourth inner electrode side, whereby the parasitic capacitance Cp (see FIG. 4) connected in parallel to the resistance component of the multilayer capacitor becomes smaller. Also, in the multilayer capacitor in accordance with this aspect of the present invention, the second inner electrode is integrally provided with the second terminal connection part connected to the second terminal electrode and the second linking connection part connected to the second linking electrode, the third inner electrode is integrally provided with the third linking connection part connected to the second linking electrode, and the second and third inner electrodes, which are homopolar with each other, overlap each other as seen in the laminating direction of the plurality of dielectric layers. Therefore, the second inner electrode in which the resistance component ESR (see FIG. 4) of the multilayer capacitor occurs when a current flows does not oppose any heteropole in a neighboring manner on the side adjacent to the third inner electrode, whereby the parasitic capacitance Cp (see FIG. 4) connected in parallel to the resistance component of the multilayer capacitor becomes smaller. As a result, as illustrated by the solid line a in FIG. 3, the impedance can be inhibited from decreasing near the resonance frequency, whereby impedance fluctuations are suppressed over a broad bandwidth including the vicinity of the resonance frequency.

Also, in the multilayer capacitor in accordance with this aspect of the present invention, the first and second inner electrodes, which are heteropolar to each other, are arranged on the same dielectric layer (first dielectric layer). As a result, the number of laminations of dielectric layers constituting the matrix decreases, whereby the multilayer capacitor can be made smaller.

Further, in the multilayer capacitor in accordance with this aspect of the present invention, the third inner electrode is integrally provided with the third linking connection part connected to the second linking electrode, the fourth inner electrode is integrally provided with the fourth linking connection part connected to the first linking electrode, and the third and fourth inner electrodes, which are heteropolar to each other, oppose each other in a neighboring manner in the laminating direction of the plurality of dielectric layers. Therefore, a capacity component C (see FIG. 4) of the multilayer capacitor occurs between the third and fourth inner electrodes connected to none of the first and second terminal electrodes. This, together with the fact that the first and second inner electrodes, which are heteropolar to each other, are arranged on the same dielectric layer, can increase the total capacitance C (see FIG. 4) of the multilayer capacitor while making the multilayer capacitor smaller. As a result, the impedance can be decreased over the whole low-frequency band as illustrated by the dash-double-dot line c2 in FIG. 3.

Preferably, the multilayer capacitor comprises a fifth inner electrode arranged within the matrix, the fifth inner electrode is arranged on the second dielectric layer while being separated from the third inner electrode, the fifth inner electrode is integrally provided with a fifth linking connection part connected to the first linking electrode, the fifth inner electrode is adjacent to the first and fourth inner electrodes in the laminating direction of the plurality of dielectric layers, the first and fifth inner electrodes overlap each other as seen in the laminating direction of the plurality of dielectric layers, the second and fifth inner electrodes are kept from overlapping each other as seen in the laminating direction of the plurality of dielectric layers, and the fourth and fifth inner electrodes overlap each other as seen in the laminating direction of the plurality of dielectric layers. In this case, the first inner electrode in which the resistance component ESR (see FIG. 4) of the multilayer capacitor occurs when a current flows does not oppose any heteropole in a neighboring manner on the side adjacent to the fifth inner electrode, whereby the parasitic capacitance Cp (see FIG. 4) connected in parallel to the resistance component of the multilayer capacitor can be made smaller.

In still another aspect, the present invention provides a multilayer capacitor comprising a matrix constituted by a plurality of laminated dielectric layers having at least first to third dielectric layers, first and second terminal electrodes arranged on an outer surface of the matrix, first and second linking electrodes arranged on the outer surface of the matrix, and first to fifth inner electrodes arranged within the matrix; wherein the first, second, and third dielectric layers are laminated in succession; wherein the first and second inner electrodes are arranged on the first dielectric layer while being separated from each other; wherein the third and fifth inner electrodes are arranged on the second dielectric layer while being separated from each other; the fourth inner electrode is arranged on the third dielectric layer; wherein the first inner electrode is integrally provided with a first terminal connection part connected to the first terminal electrode and a first linking connection part connected to the first linking electrode; wherein the second inner electrode is integrally provided with a second terminal connection part connected to the second terminal electrode and a second linking connection part connected to the second linking electrode; wherein the third inner electrode is integrally provided with a third linking connection part connected to the second linking electrode; wherein the fourth inner electrode is integrally provided with a fourth linking connection part connected to the first linking electrode; wherein the fifth inner electrode is integrally provided with a fifth linking connection part connected to the first linking electrode; wherein the first inner electrode is adjacent to the fifth inner electrode in a laminating direction of the plurality of dielectric layers; wherein the third inner electrode is adjacent to the second and fourth inner electrodes in the laminating direction of the plurality of dielectric layers; wherein the first and fifth inner electrodes overlap each other as seen in the laminating direction of the plurality of dielectric layers; wherein the first and third inner electrodes are kept from overlapping each other as seen in the laminating direction of the plurality of dielectric layers; wherein the second and fifth inner electrodes are kept from overlapping each other as seen in the laminating direction of the plurality of dielectric layers; and wherein the second, third, and fourth inner electrodes overlap one another as seen in the laminating direction of the plurality of dielectric layers.

In the multilayer capacitor in accordance with this aspect of the present invention, the first inner electrode is integrally provided with the first terminal connection part connected to the first terminal electrode and the first linking connection part connected to the first linking electrode, the third inner electrode is integrally provided with the third linking connection part connected to the second linking electrode, the fifth inner electrode is integrally provided with the fifth linking connection part connected to the first linking electrode, the first and fifth inner electrodes, which are homopolar with each other, overlap each other as seen in the laminating direction of the plurality of dielectric layers, and the first and third inner electrodes are kept from overlapping each other as seen in the laminating direction of the plurality of dielectric layers. Therefore, the first inner electrode in which the resistance component ESR (see FIG. 4) of the multilayer capacitor occurs when a current flows does not oppose any heteropole in a neighboring manner on the side adjacent to the fifth inner electrode, whereby the parasitic capacitance Cp (see FIG. 4) connected in parallel to the resistance component of the multilayer capacitor becomes smaller. Also, in the multilayer capacitor in accordance with this aspect of the present invention, the second inner electrode is integrally provided with the second terminal connection part connected to the second terminal electrode and the second linking connection part connected to the second linking electrode, the third inner electrode is integrally provided with the third linking connection part connected to the second linking electrode, the fifth inner electrode is integrally provided with the fifth linking connection part connected to the first linking electrode, the second and third inner electrodes, which are homopolar with each other, overlap each other as seen in the laminating direction of the plurality of dielectric layers, and the second and fifth inner electrodes are kept from overlapping each other as seen in the laminating direction of the plurality of dielectric layers. Therefore, the second inner electrode in which the resistance component ESR (see FIG. 4) of the multilayer capacitor occurs when a current flows does not oppose any heteropole in a neighboring manner on the side adjacent to the third inner electrode, whereby the parasitic capacitance Cp (see FIG. 4) connected in parallel to the resistance component of the multilayer capacitor becomes smaller. As a result, as illustrated by the solid line a in FIG. 3, the impedance can be inhibited from decreasing near the resonance frequency, whereby impedance fluctuations are suppressed over a broad bandwidth including the vicinity of the resonance frequency.

Also, in the multilayer capacitor in accordance with this aspect of the present invention, the first and second inner electrodes, which are heteropolar to each other, are arranged on the same dielectric layer (first dielectric layer), while the third and fifth inner electrodes, which are heteropolar to each other, are arranged on the same dielectric layer (second dielectric layer). As a result, the number of laminations of dielectric layers constituting the matrix decreases, whereby the multilayer capacitor can be made smaller.

Further, in the multilayer capacitor in accordance with this aspect of the present invention, the third inner electrode is integrally provided with the third linking connection part connected to the second linking electrode, the fourth inner electrode is integrally provided with the fourth linking connection part connected to the first linking electrode, and the third and fourth inner electrodes, which are heteropolar to each other, oppose each other in the laminating direction of the plurality of dielectric layers. Therefore, the capacity component C (see FIG. 4) of the multilayer capacitor occurs between the third and fourth inner electrodes connected to none of the first and second terminal electrodes. This, together with the fact that the first and second inner electrodes, which are heteropolar to each other, are arranged on the same dielectric layer, and the third and fourth inner electrodes, which are heteropolar to each other, are arranged on the same dielectric layer as mentioned above, can increase the total capacitance C (see FIG. 4) of the multilayer capacitor while making the multilayer capacitor smaller. As a result, the impedance can be decreased over the whole low-frequency band as illustrated by the dash-double-dot line c2 in FIG. 3.

Preferably, the multilayer capacitor comprises sixth to tenth inner electrodes arranged within the matrix; the plurality of dielectric layers include fourth to sixth dielectric layers; the first, second, third, sixth, fourth, and fifth dielectric layers are laminated in succession; the matrix has a first main face positioned on the first dielectric layer side in the laminating direction of the plurality of dielectric layers and a second main face positioned on the fifth dielectric layer side in the laminating direction of the plurality of dielectric layers, the sixth and seventh inner electrodes are arranged on the fourth dielectric layer while being separated from each other; the eighth and ninth inner electrodes are arranged on the fifth dielectric layer while being separated from each other; the tenth inner electrode is arranged on the sixth dielectric layer; the sixth inner electrode is integrally provided with a sixth linking connection part connected to the first linking electrode; the seventh inner electrode is integrally provided with a seventh linking connection part connected to the second linking electrode; the eighth inner electrode is integrally provided with a third terminal connection part connected to the first terminal electrode and an eighth linking connection part connected to the first linking electrode; the ninth inner electrode is integrally provided with a fourth terminal connection part connected to the second terminal electrode and a ninth linking connection part connected to the second linking electrode; the tenth inner electrode is integrally provided with a tenth linking connection part connected to the second linking electrode; the sixth inner electrode is adjacent to the eighth and tenth inner electrodes in the laminating direction of the plurality of dielectric layers; the seventh inner electrode is adjacent to the ninth inner electrode in the laminating direction of the plurality of dielectric layers; the sixth, eighth, and tenth inner electrodes overlap one another as seen in the laminating direction of the plurality of dielectric layers; the sixth and ninth inner electrodes are kept from overlapping each other as seen in the laminating direction of the plurality of dielectric layers; the seventh and eighth inner electrodes are kept from overlapping each other as seen in the laminating direction of the plurality of dielectric layers; the seventh and ninth inner electrodes overlap each other as seen in the laminating direction of the plurality of dielectric layers; and a linear distance from the first and second inner electrodes to the first main face in the laminating direction of the plurality of dielectric layers is substantially the same as that from the eighth and ninth inner electrodes to the second main face in the laminating direction of the plurality of dielectric layers.

In this case, the eighth inner electrode in which the resistance component ESR (see FIG. 4) of the multilayer capacitor occurs when a current flows does not oppose any heteropole in a neighboring manner on the side adjacent to the sixth inner electrode, while the ninth inner electrode in which the resistance component ESR (see FIG. 4) of the multilayer capacitor occurs when the current flows does not oppose any heteropole in a neighboring manner on the side adjacent to the seventh inner electrode, whereby the parasitic capacitance Cp (see FIG. 4) connected in parallel to the resistance component of the multilayer capacitor becomes smaller. As a result, as illustrated by the solid line a in FIG. 3, the impedance can be inhibited from decreasing near the resonance frequency, whereby impedance fluctuations are suppressed over a broad bandwidth including the vicinity of the resonance frequency.

Also, the sixth and seventh inner electrodes, which are heteropolar to each other, are arranged on the same dielectric layer (fourth dielectric layer), while the eighth and ninth inner electrodes, which are heteropolar to each other, are arranged on the same dielectric layer (fifth dielectric layer). As a result, the number of laminations of dielectric layers constituting the matrix decreases, whereby the multilayer capacitor can be made smaller.

Further, in this case, the capacity component C (see FIG. 4) of the multilayer capacitor occurs between the sixth and tenth inner electrodes connected to none of the first and second terminal electrodes. This, together with the fact that the sixth and seventh inner electrodes, which are heteropolar to each other, are arranged on the same dielectric layer, and the eighth and ninth inner electrodes, which are heteropolar to each other, are arranged on the same dielectric layer as mentioned above, can increase the total capacitance C (see FIG. 4) of the multilayer capacitor while making the multilayer capacitor smaller. As a result, the impedance can be decreased over the whole low-frequency band as illustrated by the dash-double-dot line c2 in FIG. 3.

If the linear distance between the first main face and the first and second inner electrodes differs from that between the second main face and the eighth and ninth inner electrodes, a current flow path may vary according to whether the multilayer capacitor is mounted to a circuit board by using the first or second main face as a mounting surface, whereby the high-frequency characteristic may change depending on the state in which the multilayer capacitor is mounted to the circuit board. When the linear distance from the first main face to the first and second inner electrodes is substantially the same as that from the second main face to the eighth and ninth inner electrodes as mentioned above, by contrast, there is hardly any fear of changing the high-frequency characteristic. Since the multilayer capacitor is an industrial product and may incur errors within a certain tolerance, "substantially the same" herein encompasses the sameness within the tolerance in the industrial product.

Preferably, the multilayer capacitor comprises sixth to ninth inner electrodes arranged within the matrix; the plurality of dielectric layers include fourth and fifth dielectric layers; the first, second, third, fourth, and fifth dielectric layers are laminated in succession; the matrix has a first main face positioned on the first dielectric layer side in the laminating direction of the plurality of dielectric layers and a second main face positioned on the fifth dielectric layer side in the laminating direction of the plurality of dielectric layers; the sixth and seventh inner electrodes are arranged on the fourth dielectric layer while being separated from each other; the eighth and ninth inner electrodes are arranged on the fifth dielectric layer while being separated from each other; the sixth inner electrode is integrally provided with a sixth linking connection part connected to the first linking electrode; the seventh inner electrode is integrally provided with a seventh linking connection part connected to the second linking electrode; the eighth inner electrode is integrally provided with a third terminal connection part connected to the first terminal electrode and an eighth linking connection part connected to the first linking electrode; the ninth inner electrode is integrally provided with a fourth terminal connection part connected to the second terminal electrode and a ninth linking connection part connected to the second linking electrode; the fourth inner electrode is adjacent to the seventh inner electrode in the laminating direction of the plurality of dielectric layers; the sixth inner electrode is adjacent to the eighth inner electrode in the laminating direction of the plurality of dielectric layers; the seventh inner electrode is adjacent to the ninth inner electrode in the laminating direction of the plurality of dielectric layers; the fourth, seventh, and ninth inner electrodes overlap one another as seen in the laminating direction of the plurality of dielectric layers; the sixth and eighth inner electrodes overlap each other as seen in the laminating direction of the plurality of dielectric layers; the sixth and ninth inner electrodes are kept from overlapping each other as seen in the laminating direction of the plurality of dielectric layers; the seventh and eighth inner electrodes are kept from overlapping each other as seen in the laminating direction of the plurality of dielectric layers; and a linear distance from the first and second inner electrodes to the first main face in the laminating direction of the plurality of dielectric layers is substantially the same as that from the eighth and ninth inner electrodes to the second main face in the laminating direction of the plurality of dielectric layers.

In this case, the eighth inner electrode in which the resistance component ESR (see FIG. 4) of the multilayer capacitor occurs when a current flows does not oppose any heteropole in a neighboring manner on the side adjacent to the sixth inner electrode, while the ninth inner electrode in which the resistance component ESR (see FIG. 4) of the multilayer capacitor occurs when the current flows does not oppose any heteropole in a neighboring manner on the side adjacent to the seventh inner electrode, whereby the parasitic capacitance Cp (see FIG. 4) connected in parallel to the resistance component of the multilayer capacitor becomes smaller. As a result, as illustrated by the solid line a in FIG. 3, the impedance can be inhibited from decreasing near the resonance frequency, whereby impedance fluctuations are suppressed over a broad bandwidth including the vicinity of the resonance frequency.

Also, the sixth and seventh inner electrodes, which are heteropolar to each other, are arranged on the same dielectric layer (fourth dielectric layer), while the eighth and ninth inner electrodes, which are heteropolar to each other, are arranged on the same dielectric layer (fifth dielectric layer). As a result, the number of laminations of dielectric layers constituting the matrix decreases, whereby the multilayer capacitor can further be made smaller.

Further, in this case, the capacity component C (see FIG. 4) of the multilayer capacitor occurs between the fourth and seventh inner electrodes connected to none of the first and second terminal electrodes. This, together with the fact that the sixth and seventh inner electrodes, which are heteropolar to each other, are arranged on the same dielectric layer, and the eighth and ninth inner electrodes, which are heteropolar to each other, are arranged on the same dielectric layer as mentioned above, can increase the total capacitance C (see FIG. 4) of the multilayer capacitor while making the multilayer capacitor smaller. As a result, the impedance can be decreased over the whole low-frequency band as illustrated by the dash-double-dot line c2 in FIG. 3.

If the linear distance between the first main face and the first and second inner electrodes differs from that between the second main face and the eighth and ninth inner electrodes, a current flow path may vary according to whether the multilayer capacitor is mounted to a circuit board by using the first or second main face as a mounting surface, whereby the high-frequency characteristic may change depending on the state in which the multilayer capacitor is mounted to the circuit board. When the linear distance from the first main face to the first and second inner electrodes is substantially the same as that from the second main face to the eighth and ninth inner electrodes as mentioned above, by contrast, there is hardly any fear of changing the high-frequency characteristic. Since the multilayer capacitor is an industrial product and may incur errors within a certain tolerance, "substantially the same" herein encompasses the sameness within the tolerance in the industrial product.

Preferably, the matrix has a first main face positioned on the first dielectric layer side in the laminating direction of the plurality of dielectric layers and a second main face positioned on the third dielectric layer side in the laminating direction of the plurality of dielectric layers, and a linear distance from the first and second inner electrodes to the first main face in the laminating direction of the plurality of dielectric layers is substantially the same as a linear distance from the first and second inner electrodes to the second main face in the laminating direction of the plurality of dielectric layers.

If the linear distance between the first main face and the first and second inner electrodes differs from that between the second main face and the first and second inner electrodes, a current flow path may vary according to whether the multilayer capacitor is mounted to a circuit board by using the first or second main face as a mounting surface, whereby the high-frequency characteristic may change depending on the state in which the multilayer capacitor is mounted to the circuit board. When the linear distance from the first main face to the first and second inner electrodes is substantially the same as that from the second main face to the first and second inner electrodes as mentioned above, by contrast, there is hardly any fear of changing the high-frequency characteristic. Since the multilayer capacitor is an industrial product and may incur errors within a certain tolerance, "substantially the same" herein encompasses the sameness within the tolerance in the industrial product.

More preferably, the multilayer capacitor comprises sixth and seventh inner electrodes arranged within the matrix; the plurality of dielectric layers include a fourth dielectric layer; the fourth, first, second, and third dielectric layers are laminated in succession; the sixth and seventh inner electrodes are arranged on the fourth dielectric layer while being separated from each other; the sixth inner electrode is integrally provided with a sixth linking connection part connected to the first linking electrode; the seventh inner electrode is integrally provided with a seventh linking connection part connected to the second linking electrode; the sixth inner electrode is adjacent to the first inner electrode in the laminating direction of the plurality of dielectric layers; the seventh inner electrode is adjacent to the second inner electrode in the laminating direction of the plurality of dielectric layers; the sixth and first inner electrodes overlap each other as seen in the laminating direction of the plurality of dielectric layers; the sixth and second inner electrodes are kept from overlapping each other as seen in the laminating direction of the plurality of dielectric layers; the seventh and first inner electrodes are kept from overlapping each other as seen in the laminating direction of the plurality of dielectric layers; and the seventh and second inner electrodes overlap each other as seen in the laminating direction of the plurality of dielectric layers.

In this case, the first inner electrode in which the resistance component ESR (see FIG. 4) of the multilayer capacitor occurs when a current flows does not oppose any heteropole in a neighboring manner on the side adjacent to the sixth inner electrode, while the second inner electrode in which the resistance component ESR (see FIG. 4) of the multilayer capacitor occurs when the current flows does not oppose any heteropole in a neighboring manner on the side adjacent to the seventh inner electrode, whereby the parasitic capacitance Cp (see FIG. 4) connected in parallel to the resistance component of the multilayer capacitor becomes smaller. As a result, as illustrated by the solid line a in FIG. 3, the impedance can be inhibited from decreasing near the resonance frequency, whereby impedance fluctuations are suppressed over a broad bandwidth including the vicinity of the resonance frequency.

Also, the sixth and seventh inner electrodes, which are heteropolar to each other, are arranged on the same dielectric layer (fourth dielectric layer). As a result, the number of laminations of dielectric layers constituting the matrix decreases, whereby the multilayer capacitor can further be made smaller.

Preferably, the first inner electrode has a first terminal-side region located closer to the first terminal connection part than is a portion provided with the first linking connection part, the second inner electrode has a second terminal-side region located closer to the second terminal connection part than is a portion provided with the second linking connection part, and each of the first and second terminal-side regions is provided with a plurality of openings.

More preferably, the plurality of openings are arranged such as to form a mesh.

For reducing the opposing area of the first inner electrode and its heteropolar inner electrode and the opposing area of the second inner electrode and its heteropolar inner electrode, the first and second inner electrodes may be formed into a single thin line, for example. In this case, however, a current flows through the single thin line part in a concentrated manner, thereby increasing equivalent series inductance (ESL). The ESL is connected in series to the capacitance C in the equivalent circuit of the multilayer capacitor (see FIG. 4) and acts to deter the capacitor from being rapidly charged and discharged. Therefore, the circuit is inhibited from speeding up as the ESL increases. When a plurality of openings are provided in the first and second inner electrodes such as to form a mesh (net) as mentioned above, by contrast, the current flows in a dispersive manner through the first and second inner electrodes, thereby lowering the ESL. As a result, the impedance can be decreased over the whole high-frequency band as illustrated by the dash-single-dot line c1 in FIG. 3. Also, since each of the first and second terminal-side regions is provided with a plurality of openings, the opposing area of the first inner electrode and its heteropole as seen in the laminating direction of the plurality of dielectric layers is reduced, and the opposing area of the second inner electrode and its heteropole as seen in the laminating direction of the plurality of dielectric layers is reduced. Therefore, the first and second inner electrodes are less susceptible to magnetic fluxes from their heteropoles, whereby the parasitic capacitance Cp (see FIG. 4) connected in parallel to the resistance component of the multilayer capacitor becomes smaller. As a result, as illustrated by the solid line a in FIG. 3, the impedance can be inhibited from decreasing near the resonance frequency, whereby impedance fluctuations are suppressed over a broad bandwidth including the vicinity of the resonance frequency.

In still another aspect, the present invention provides a multilayer capacitor comprising a matrix constituted by a plurality of laminated dielectric layers having at least first to third dielectric layers, first and second terminal electrodes arranged on an outer surface of the matrix, first and second linking electrodes arranged on the outer surface of the matrix, and first to fourth inner electrodes arranged within the matrix; wherein the first and fourth inner electrodes are arranged on the first dielectric layer while being separated from each other; wherein the second inner electrode is arranged on the second dielectric layer; wherein the third inner electrode is arranged on the third dielectric layer; wherein the first inner electrode is integrally provided with a first terminal connection part connected to the first terminal electrode and a first linking connection part connected to the first linking electrode; wherein the second inner electrode is integrally provided with a second terminal connection part connected to the second terminal electrode and a second linking connection part connected to the second linking electrode; wherein the third inner electrode is integrally provided with a third linking connection part connected to the first linking electrode; wherein the fourth inner electrode is integrally provided with a fourth linking connection part connected to the second linking electrode; the third inner electrode is adjacent to the first and fourth inner electrodes in a laminating direction of the plurality of dielectric layers; and wherein the first and fourth inner electrodes overlap the third inner electrode as seen in the laminating direction of the plurality of dielectric layers.

In the multilayer capacitor in accordance with this aspect of the present invention, the first inner electrode is integrally provided with the first terminal connection part connected to the first terminal electrode and the first linking connection part connected to the first linking electrode, the third inner electrode is integrally provided with the third linking connection part connected to the first linking electrode, and the first and third inner electrodes, which are homopolar with each other, are adjacent to each other in the laminating direction of the plurality of dielectric layers and overlap each other as seen in the laminating direction of the plurality of dielectric layers. Therefore, the first inner electrode in which the resistance component ESR (see FIG. 4) of the multilayer capacitor occurs when a current flows does not oppose any heteropole in a neighboring manner on the side adjacent to the third inner electrode, whereby the parasitic capacitance Cp (see FIG. 4) connected in parallel to the resistance component of the multilayer capacitor becomes smaller. As a result, as illustrated by the solid line a in FIG. 3, the impedance can be inhibited from decreasing near the resonance frequency, whereby impedance fluctuations are suppressed over a broad bandwidth including the vicinity of the resonance frequency.

Also, in the multilayer capacitor in accordance with this aspect of the present invention, the first inner electrode is integrally provided with the first terminal connection part connected to the first terminal electrode and the first linking connection part connected to the first linking electrode, the fourth inner electrode is integrally provided with the fourth linking connection part connected to the second linking electrode, and the first and fourth inner electrodes are arranged on the first dielectric layer. Therefore, the first and fourth inner electrodes, which are heteropolar to each other, are arranged on the same dielectric layer. As a result, the number of laminations of dielectric layers constituting the matrix decreases, whereby the multilayer capacitor can further be made smaller.

Further, in the multilayer capacitor in accordance with this aspect of the present invention, the third inner electrode is integrally provided with the third linking connection part connected to the first linking electrode, the fourth inner electrode is integrally provided with the fourth linking connection part connected to the second linking electrode, and the third and fourth inner electrodes, which are heteropolar to each other, overlap each other as seen in the laminating direction of the plurality of dielectric layers. Therefore, the capacity component C (see FIG. 4) of the multilayer capacitor occurs between the third and fourth inner electrodes where the resistance component ESR (see FIG. 4) of the multilayer capacitor is not generated when a current flows. This, together with the fact that the first and fourth inner electrodes, which are heteropolar to each other, are arranged on the same dielectric layer as mentioned above, can increase the total capacitance of the multilayer capacitor while making the multilayer capacitor smaller. As a result, the impedance can be decreased over the whole low-frequency band as illustrated by the dash-double-dot line c2 in FIG. 3.

Preferably, the multilayer capacitor comprises a fifth inner electrode arranged within the matrix, the fifth inner electrode is integrally provided with a fifth linking connection part connected to the first linking electrode, the fifth inner electrode is adjacent to the first inner electrode in the laminating direction of the plurality of dielectric layers, and the first and fifth inner electrodes overlap each other as seen in the laminating direction of the plurality of dielectric layers. In this case, the first inner electrode in which the resistance component ESR (see FIG. 4) of the multilayer capacitor occurs when a current flows does not oppose any heteropole in a neighboring manner on the side adjacent to the fifth inner electrode, whereby the parasitic capacitance Cp (see FIG. 4) connected in parallel to the resistance component of the multilayer capacitor can be made smaller.

More preferably, the second and fifth inner electrodes are arranged on the second dielectric layer while being separated from each other. In this case, the second and fifth inner electrodes, which are heteropolar to each other, are arranged on the same dielectric layer. As a result, the number of laminations of dielectric layers constituting the matrix decreases, whereby the multilayer capacitor can be made smaller.

Preferably, the multilayer capacitor comprises fifth and sixth inner electrodes arranged within the matrix, the plurality of dielectric layers include a fourth dielectric layer, the second and fifth inner electrodes are arranged on the second dielectric layer while being separated from each other, the sixth inner electrode is arranged on the fourth dielectric layer, the fifth inner electrode is integrally provided with a fifth linking connection part connected to the first linking electrode, the sixth inner electrode is integrally provided with a sixth linking connection part connected to the second linking electrode, the sixth inner electrode is adjacent to the second and fifth inner electrodes in the laminating direction of the plurality of dielectric layers, and the second, fifth, and sixth inner electrodes overlap one another as seen in the laminating direction of the plurality of dielectric layers. In this case, the second inner electrode in which the resistance component ESR (see FIG. 4) of the multilayer capacitor occurs when a current flows does not oppose any heteropole in a neighboring manner on the side adjacent to the sixth inner electrode, whereby the parasitic capacitance Cp (see FIG. 4) connected in parallel to the resistance component of the multilayer capacitor becomes smaller. As a result, as illustrated by the solid line in FIG. 3, the impedance can be inhibited from decreasing near the resonance frequency, whereby impedance fluctuations are suppressed over a broad bandwidth including the vicinity of the resonance frequency. Also, in this case, the second and fifth inner electrodes, which are heteropolar to each other, are arranged on the same dielectric layer. As a result, the number of laminations of dielectric layers constituting the matrix decreases, whereby the multilayer capacitor can be made smaller. Further, in this case, a capacity component C (see FIG. 4) of the multilayer capacitor occurs between the second and fourth inner electrodes in which the resistance component ESR (see FIG. 4) of the multilayer capacitor does not occur when a current flows. This, together with the fact that the second and fifth inner electrodes, which are heteropolar to each other, are arranged on the same dielectric layer as mentioned above, can increase the total capacitance C of the multilayer capacitor while making the multilayer capacitor smaller. As a result, the impedance can be decreased over the whole low-frequency band as illustrated by the dash-double-dot line c2 in FIG. 3.

More preferably, the multilayer capacitor comprises seventh and eighth inner electrodes arranged within the matrix, the plurality of dielectric layers include fifth and sixth dielectric layers, the seventh inner electrode is arranged on the fifth dielectric layer, the eighth inner electrode is arranged on the sixth dielectric layer, the seventh inner electrode is integrally provided with a seventh linking connection part connected to the first linking electrode, the eighth inner electrode is integrally provided with an eighth linking connection part connected to the second linking electrode, the seventh inner electrode is adjacent to the first inner electrode in the laminating direction of the plurality of dielectric layers, the eighth inner electrode is adjacent to the second inner electrode in the laminating direction of the plurality of dielectric layers, the first and seventh inner electrodes overlap each other as seen in the laminating direction of the plurality of dielectric layers, and the second and eighth inner electrodes overlap each other as seen in the laminating direction of the plurality of dielectric layers. In this case, the first inner electrode in which the resistance component ESR (see FIG. 4) of the multilayer capacitor occurs when a current flows does not oppose any heteropole in a neighboring manner on the side adjacent to the seventh inner electrode, whereby the parasitic capacitance Cp (see FIG. 4) connected in parallel to the resistance component of the multilayer capacitor can be made smaller. Also, in this case, the second inner electrode in which the resistance component ESR (see FIG. 4) of the multilayer capacitor occurs when a current flows does not oppose any heteropole in a neighboring manner on the side adjacent to the eighth inner electrode, whereby the parasitic capacitance Cp (see FIG. 4) connected in parallel to the resistance component of the multilayer capacitor can be made smaller.

Preferably, the first inner electrode has a first terminal-side region located closer to the first terminal connection part than is a portion provided with the first linking connection part, the second inner electrode has a second terminal-side region located closer to the second terminal connection part than is a portion provided with the second linking connection part, and each of the first and second terminal-side regions is provided with a plurality of openings.

More preferably, the plurality of openings are arranged such as to form a mesh.

For reducing the opposing area of the first inner electrode and its heteropolar inner electrode and the opposing area of the second inner electrode and its heteropolar inner electrode, the first and second inner electrodes may be formed into a single thin line, for example. In this case, however, a current flows through the single thin line part in a concentrated manner, thereby increasing equivalent series inductance (ESL). The ESL is connected in series to the capacitance C in the equivalent circuit of the multilayer capacitor (see FIG. 4) and acts to deter the capacitor from being rapidly charged and discharged. Therefore, the circuit is inhibited from speeding up as the ESL increases. When a plurality of openings are provided in the first and second inner electrodes such as to form a mesh (net) as mentioned above, by contrast, the current flows in a dispersive manner through the first and second inner electrodes, thereby lowering the ESL. As a result, the impedance can be decreased over the whole high-frequency band as illustrated by the dash-single-dot line c1 in FIG. 3. Also, since each of the first and second terminal-side regions is provided with a plurality of openings, the opposing area of the first inner electrode and its heteropole as seen in the laminating direction of the plurality of dielectric layers is reduced, and the opposing area of the second inner electrode and its heteropole as seen in the laminating direction of the plurality of dielectric layers is reduced. Therefore, the first and second inner electrodes are less susceptible to magnetic fluxes from their heteropoles, whereby the parasitic capacitance Cp (see FIG. 4) connected in parallel to the resistance component of the multilayer capacitor becomes smaller. As a result, as illustrated by the solid line a in FIG. 3, the impedance can be inhibited from decreasing near the resonance frequency, whereby impedance fluctuations are suppressed over a broad bandwidth including the vicinity of the resonance frequency.

The present invention will be more fully understood from the detailed description given herein below and the accompanying drawings, which are given by way of illustration only, and thus are not to be considered as limiting the present invention.

DESCRIPTION OF THE PREFERRED EMBODIMENTS

Preferred embodiments of the multilayer capacitor in accordance with the present invention will be explained with reference to the drawings. In the explanations, the same signs refer to the same constituents or those having the same functions, while omitting their overlapping descriptions.

First Embodiment

The structure of a multilayer capacitor 1 in accordance with the first embodiment will be explained with reference to FIGS. 1 and 2. The multilayer capacitor 1 comprises a rectangular parallelepiped dielectric matrix (matrix) 10, inner electrodes 12A, 12B, 14A, 14B (first to fourth inner electrodes), terminal electrodes 18A, 18B (first and second terminal electrodes), and linking electrodes 20A and 20B (first and second linking electrodes).

The dielectric matrix 10 has main faces 10*a*, 10*b* opposing each other, side faces 10*c*, 10*d* opposing each other, and side faces 10*e*, 10*f* opposing each other. In the first embodiment, the main face 10*a* or 10*b* is a mounting surface opposing the main face of a circuit board (not illustrated).

The side faces 10*c*, 10*d* extend so as to connect the main faces 10*a*, 10*b* and side faces 10*e*, 10*f*. The side faces 10*e*, 10*f* extend so as to connect the main faces 10*a*, 10*b* and side faces 10*c*, 10*d*. In the first embodiment, the length in the longitudinal direction, width, and thickness of the dielectric matrix 10 can be set to about 1.0 mm, about 0.5 mm, and about 0.5 mm, respectively, for example. Since the dielectric matrix 10 is typically barrel-polished after firing, ridge parts of the dielectric matrix 10 exhibit curved surfaces with a predetermined curvature (not illustrated).

Figure 2:
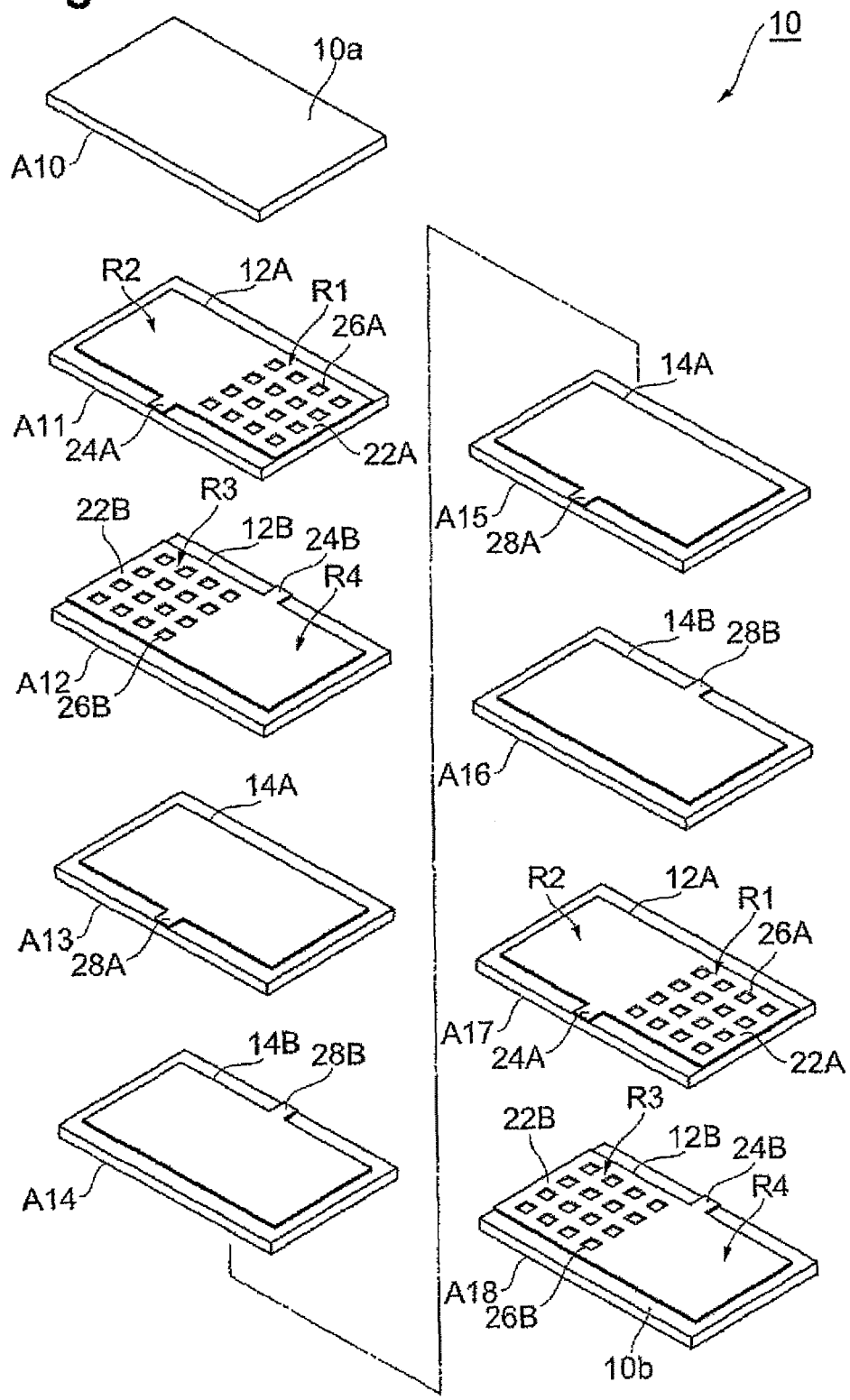
FIG. 2 is an exploded perspective view illustrating a dielectric matrix constituting a multilayer capacitor in accordance with the first embodiment.

As illustrated in FIG. 2, the dielectric matrix 10 is constructed by laminating dielectric layers A10 to A18, each having a rectangular form, in succession. Hence, the upper face of the dielectric layer A10 constitutes the main face 10*a* of the dielectric matrix 10, the lower face of the dielectric layer A18 constitutes the main face 10*b* of the dielectric matrix 10, and the opposing direction of the main faces 10*a*, 10*b* (hereinafter referred to as opposing direction) coincides with the laminating direction of the dielectric matrix 10 (dielectric layers A10 to A18) (hereinafter referred to as laminating direction) in the first embodiment.

The dielectric layers A10 to A18 function as insulators having an electric insulation property. The dielectric layers A10 to A18 can be formed by a dielectric ceramic material in which barium titanate or strontium titanate is doped with a rare-earth element, for example. In practice, the dielectric matrix 10 is integrated by firing to such an extent that boundaries between the dielectric layers A10 to A18 are indiscernible.

A surface of each of the dielectric layers A11, A17 is formed with a rectangular inner electrode 12A. The inner electrode 12A extends in the opposing direction of the side faces 10*c*, 10*d*. The inner electrode 12A is integrally provided with a terminal connection part 22A (first terminal connection part) at a shorter side facing the side face 10*c*. The terminal connection part 22A has the same width as that of the inner electrode 12A and is drawn to an edge on a side of the dielectric layer A11, A17 farmed with the terminal electrode 18A, so that an end portion thereof is exposed at the side face 10*c*. The inner electrode 12A is also integrally provided with a linking connection part 24A (first linking connection part) at a center portion of a longer side facing the side face 10*e*. The linking connection part 24A has a width sufficiently smaller than that of the inner electrode 12A and is drawn to an edge of the dielectric layer A11, A17 on a side formed with the linking electrode 20A, so that an end portion thereof is exposed at the side face 10*e*.

The inner electrode 12A has a region R1 (first terminal-side region) located closer to the terminal connection part 22A than is the portion provided with the linking connection part 24A and a region R2 (first opposite-side region) located closer to the opposite side of the terminal connection part 22A than is the portion provided with the linking connection part 24A. The region R1 is provided with a plurality of (16 in the first embodiment) openings 26A each having a square form.

The openings 26A are arranged four by four, i.e., so as to form a mesh (net), in the region R1.

A surface of each of the dielectric layers A12, A18 is formed with a rectangular inner electrode 12B. The inner electrode 12B extends in the opposing direction of the side faces 10c, 10d. The inner electrode 12B is integrally provided with a terminal connection part 22B (second terminal connection part) at a shorter side facing the side face 10d. The terminal connection part 22B has the same width as that of the inner electrode 12B and is drawn to an edge on a side of the dielectric layer A12, A18 formed with the terminal electrode 18B, so that an end portion thereof is exposed at the side face 10d. The inner electrode 12B is also integrally provided with a linking connection part 24B (second linking connection part) at a center portion of a longer side facing the side face 10f. The linking connection part 24B has a width sufficiently smaller than that of the inner electrode 12B and is drawn to an edge of the dielectric layer A12, A18 on a side formed with the linking electrode 20B, so that an end portion thereof is exposed at the side face 10f.

The inner electrode 12B has a region R3 (second terminal-side region) located closer to the terminal connection part 22B than is the portion provided with the linking connection part 24B and a region R4 (second opposite-side region) located closer to the opposite side of the terminal connection part 22B than is the portion provided with the linking connection part 24B. The region R3 is provided with a plurality of (16 in the first embodiment) openings 26A each having a square faun. The openings 26B are arranged four by four, i.e., so as to form a mesh (net), in the region R3.

A surface of each of the dielectric layers A13, A15 is formed with a rectangular inner electrode 14A. The inner electrode 14A extends in the opposing direction of the side faces 10c, 10d. The inner electrode 14A is integrally provided with a linking connection part 28A (third linking connection part) at a center portion of a longer side facing the side face 10e. The linking connection part 28A has a width sufficiently smaller than that of the inner electrode 14A and is drawn to an edge on a side of the dielectric layer A13, A15 formed with the linking electrode 20A, so that an end portion thereof is exposed at the side face 10e.

A surface of each of the dielectric layers A14, A16 is formed with a rectangular inner electrode 14B. The inner electrode 14B extends in the opposing direction of the side faces 10c, 10d. The inner electrode 14B is integrally provided with a linking connection part 28B (fourth linking connection part) at a center portion of a longer side facing the side face 10f. The linking connection part 28B has a width sufficiently smaller than that of the inner electrode 14B and is drawn to an edge on a side of the dielectric layer A14, A16 formed with the linking electrode 20B, so that an end portion thereof is exposed at the side face 10f.

The inner electrodes 12A, 12B, 14A, 14B, each of which is arranged within the dielectric matrix 10, are laminated in the order of the inner electrodes 12A, 12B, 14A, 14B, 14A, 14B, 12A, 12B alternately with the dielectric layers A11 to A17. Hence, the inner electrodes 12A, 12B, 14A, 14B are arranged within the dielectric matrix 10, while being separated from one another by the thickness of their corresponding dielectric layers A11 to A18.

The inner electrodes 12A, 12B, 14A, 14B overlap one another as seen in the laminating direction (opposing direction of the main faces 10a, 10b). More specifically, the region R1 of the inner electrode 12A and the region R4 of the inner electrode 12B overlap each other as seen in the laminating direction, while the region R2 of the inner electrode 12A and the region R3 of the inner electrode 12B overlap each other as seen in the laminating direction. The regions R3, R4 of the inner electrode 12B formed on the dielectric layer A12 overlap the inner electrode 14A formed on the dielectric layer A13 as seen in the laminating direction, while the regions R1, R2 of the inner electrode 12A formed on the dielectric layer A17 overlap the inner electrode 14B formed on the dielectric layer A16 as seen in the laminating direction. Therefore, the capacitance of the multilayer capacitor 1 is defined by the opposing area of the inner electrodes 14A, 14B as seen in the laminating direction and the gap between the inner electrodes 14A, 14B (i.e., the thickness of the dielectric layers A13 to A15), the opposing area of the region R4 of the inner electrode 12B formed on the dielectric layer A12 and the inner electrode 14A formed on the dielectric layer A13 as seen in the laminating direction and the gap between the inner electrodes 12B, 14A (i.e., the thickness of the dielectric layer A12), and the opposing area of the region R2 of the inner electrode 12A formed on the dielectric layer A17 and the inner electrode 14B formed on the dielectric layer A16 as seen in the laminating direction and the gap between the inner electrodes 12A, 14B (i.e., the thickness of the dielectric layer A16).

The inner electrodes 12A, 12B, 14A, 14B are made of a conductive material such as Ag or Ni, for example. The inner electrodes 12A, 12B, 14A, 14B are constructed as sintered bodies of a conductive paste containing the above-mentioned conductive material.

The terminal electrode 18A is formed such as to cover the side face 10c of the dielectric matrix 10 and protrude onto the main faces 10a, 10b and side faces 10e, 10f adjacent to the side face 10e. Hence, the terminal electrode 18A is arranged on the side face 10c and portions of the main faces 10a, 10b and side faces 10e, 10f which are closer to the side face 10c. The terminal electrode 18A is connected physically and electrically to the terminal connection parts 22A each having an end portion exposed at the side face 10c. Therefore, the terminal electrode 18A is electrically connected to the inner electrodes 12A.

The terminal electrode 18B is formed such as to cover the side face 10d of the dielectric matrix 10 and protrude onto the main faces 10a, 10b and side faces 10e, 10f adjacent to the side face 10d. Hence, the terminal electrode 18B is arranged on the side face 10d and portions of the main faces 10a, 10b and side faces 10e, 10f which are closer to the side face 10d. The terminal electrode 18B is connected physically and electrically to the terminal connection parts 22B each having an end portion exposed at the side face 10d. Therefore, the terminal electrode 18B is electrically connected to the inner electrodes 12B.

The linking electrode 20A is shaped rectangular and formed such as to partly cover the side face 10e of the dielectric matrix 10 and protrude onto the main faces 10a, 10b adjacent to the side face 10e. Hence, the linking electrode 20A is arranged on the side face 10e and portions of the main faces 10a, 10b which are closer to the side face 10e. The linking electrode 20A is connected physically and electrically to the linking connection parts 24A, 28A having respective end portions exposed at the side face 10e. Therefore, the inner electrodes 12A, 14A are electrically connected together through the linking electrode 20A. That is, the inner electrodes 12A, 14A become homopolar.

The linking electrode 20B is shaped rectangular and formed such as to partly cover the side face 10f of the dielectric matrix 10 and protrude onto the main faces 10a, 10b adjacent to the side face 10f. Hence, the linking electrode 20B is arranged on the side face 10f and portions of the main faces 10a, 10b which are closer to the side face 10f. The linking electrode 20B is connected physically and electrically to the linking connection parts 24B, 28B having end portions exposed at the side face 10f. Therefore, the inner electrodes 12B, 14B are electrically connected together through the linking electrode 20B. That is, the inner electrodes 12B, 14B become homopolar.

The terminal electrodes 18A, 18B and linking electrodes 20A, 20B are formed by applying and burning a conductive paste containing a conductive metal powder and glass frit onto their corresponding outer surfaces of the dielectric matrix 10, for example. Plating layers may be formed on the terminal electrodes 18A, 18B and linking electrodes 20A, 20B when necessary.

Figure 3:
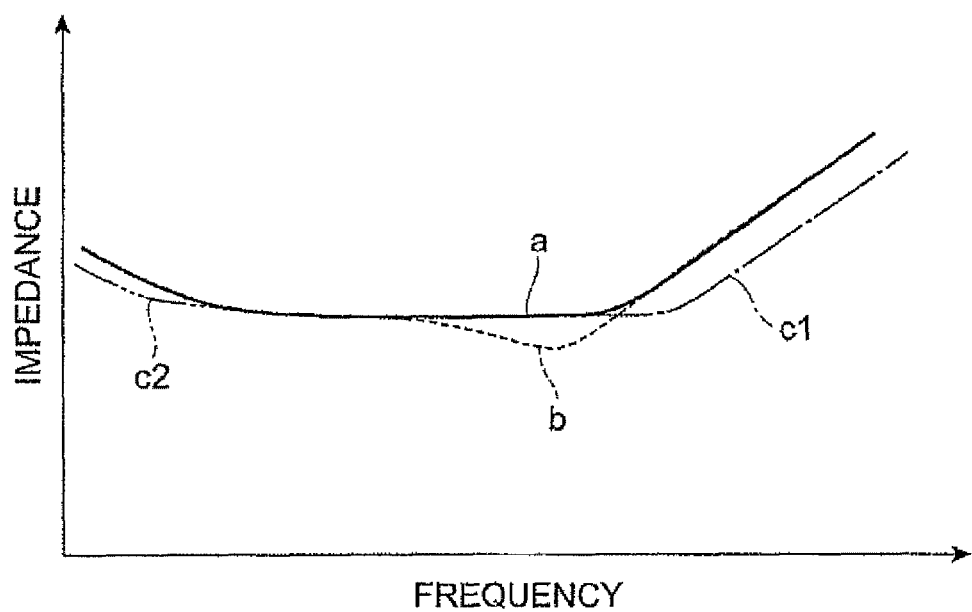
FIG. 3 is a graph illustrating impedance characteristics of the multilayer capacitor in accordance with the first to third embodiments and a conventional multilayer capacitor.
Figure 4:
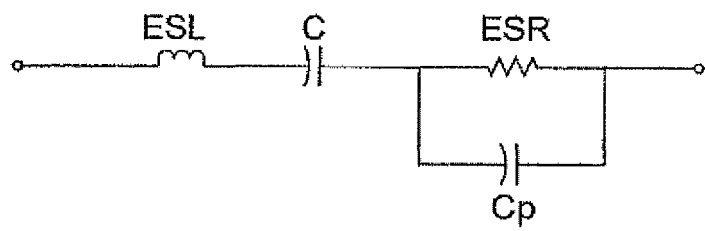
FIG. 4 is a diagram illustrating an equivalent circuit of a multilayer capacitor.

In the foregoing first embodiment, the inner electrode 12A has the region R1 located closer to the terminal connection part 22A than is the portion provided with the linking connection part 24A and the opposite-side region R2 located closer to the opposite side of the terminal connection part 22A than is the portion provided with the linking connection part 24A, while the inner electrode 12B has the region R3 located closer to the terminal connection part 22B than is the portion provided with the linking connection part 24B and the opposite-side region R4 located closer to the opposite side of the terminal connection part 22B than is the portion provided with the linking connection part 24B. Also, in the first embodiment, the regions R1, R4 overlap each other as seen in the laminating direction, while the regions R2, R3 overlap each other as seen in the laminating direction. Further, in the first embodiment, the regions R1, R3 are provided with respective pluralities of openings 26A, 26B, whereby the region R1 has an area smaller than that of the region R4, while the region R3 has an area smaller than that of the region R2. Therefore, the opposing area of the regions R1, R4 where the resistance component ESR (see FIG. 4) of the multilayer capacitor 1 occurs when a current flows becomes smaller, and the opposing area of the regions R3, R2 where the resistance component ESR (see FIG. 4) of the multilayer capacitor 1 occurs when a current flows becomes smaller, thereby lowering the parasitic capacitance Cp (see FIG. 4) connected in parallel to the resistance component of the multilayer capacitor 1. As a result, the impedance can be inhibited from decreasing near the resonance frequency, whereby impedance fluctuations are suppressed over a broad bandwidth including the vicinity of the resonance frequency as illustrated by the solid line a in FIG. 3.

For reducing the opposing area of the regions R1, R4 and the opposing area of the regions R3, R2, the regions R1, R3 may be formed into a single thin line, for example. In this case, however, a current flows through the single thin line part in a concentrated manner, thereby increasing ESL. The ESL is connected in series to the capacitance C in the equivalent circuit of the multilayer capacitor 1 (see FIG. 4) and acts to deter the capacitor from being rapidly charged and discharged. Therefore, the circuit is inhibited from speeding up as the ESL increases. When the regions R1, R3 are provided with the respective pluralities of openings 26A, 26B such as to form a mesh (net) as mentioned above, by contrast, the current flows in a dispersive manner through the regions R1, R3, thereby lowering the ESL. As a result, the impedance can be decreased over the whole high-frequency band as illustrated by the dash-single-dot line c1 in FIG. 3.

In the first embodiment, the inner electrode 12B is adjacent to the inner electrode 14A through the dielectric layer A12, the inner electrode 12A is adjacent to the inner electrode 14B through the dielectric layer A16, the region R4 and the inner electrode 14A overlap each other as seen in the laminating direction, and the region R2 and the inner electrode 14B overlap each other as seen in the laminating direction. Therefore, capacitances occur in a part where the region R4 and the inner electrode 14A overlap each other and in a part where the region R2 and the inner electrode 14B overlap each other. Consequently, the total capacitance of the multilayer capacitor 1 can be made greater. As a result, the impedance can be decreased over the whole low-frequency band as illustrated by the dash-double-dot line c2 in FIG. 3.

Though a preferred embodiment of the present invention is explained in detail in the foregoing, the present invention is not limited to the above-mentioned embodiment. For example, though two sets of inner electrodes 12A, 12B are arranged within the dielectric matrix 10, one set of inner electrodes 12A, 12B may be arranged within the dielectric matrix 10 as illustrated in FIGS. 5 and 6 or three or more sets of inner electrodes 12A, 12B may be arranged therewithin (not illustrated).

Figure 5:
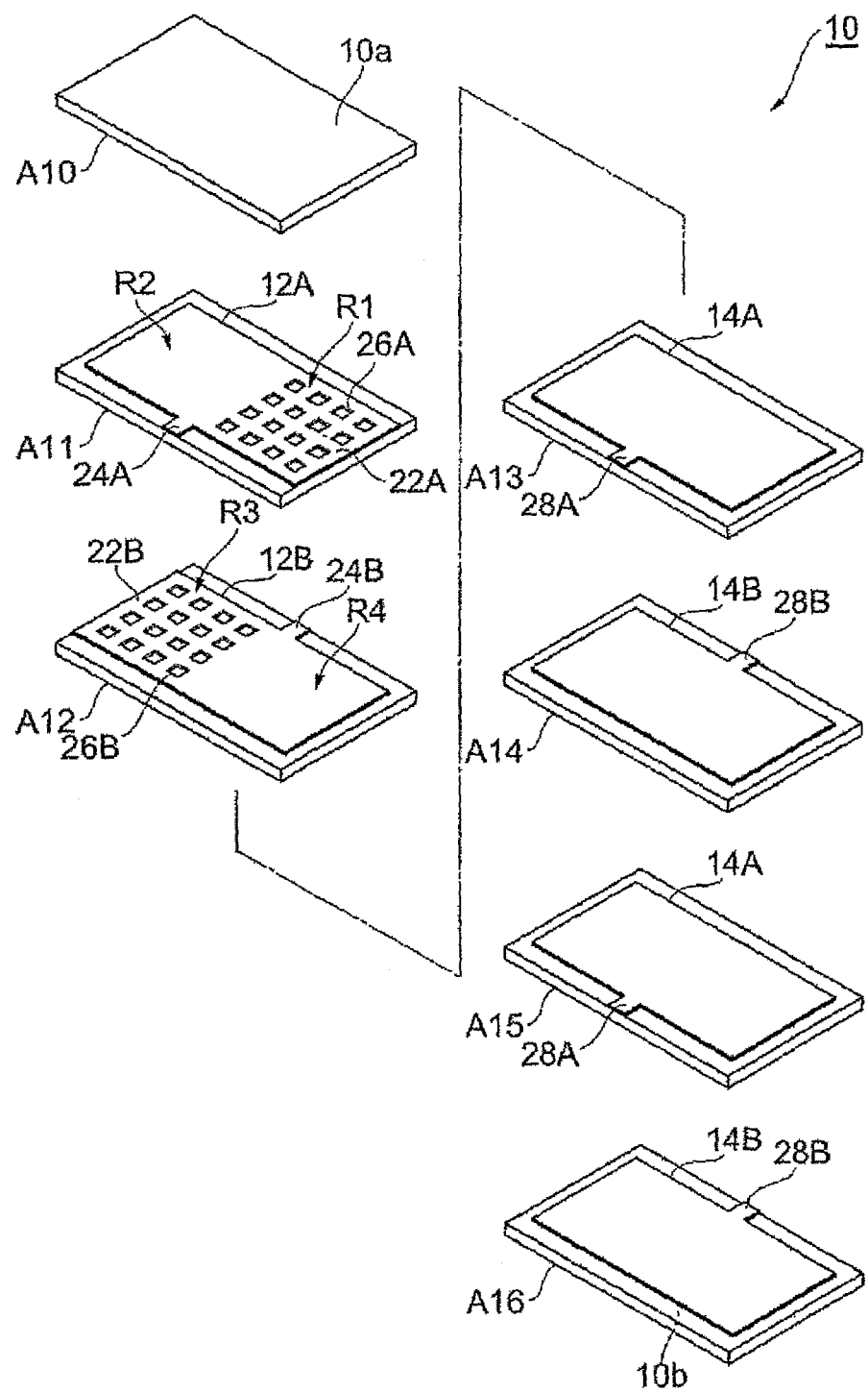
FIG. 5 is an exploded perspective view illustrating another example (first example) of the dielectric matrix constituting the multilayer capacitor in accordance with the first embodiment.

In FIG. 5, the dielectric matrix 10 is constructed by laminating dielectric layers A10 to A16 in succession, while the inner electrodes 12A, 12B, 14A, 14B are laminated within the dielectric matrix 10 in the order of the inner electrodes 12A, 12B, 14A, 14B, 14A, 14B alternately with the dielectric layers A11 to A15. In FIG. 6, the dielectric matrix 10 is constructed by laminating dielectric layers A10, A11, A14, A13, A16, A15, A12 in succession, while the inner electrodes 12A, 12B, 14A, 14B are laminated within the dielectric matrix 10 in the order of the inner electrodes 12A, 14B, 14A, 14B, 14A, 12B alternately with the dielectric layers A11, A14, A13, A16, A15.

Though the inner electrodes 14A, 14B are arranged between the inner electrodes 12A, 12B in the first embodiment, the inner electrodes 12A, 12B may be adjacent to each other in the laminating direction as illustrated in FIG. 5.

Figure 6:
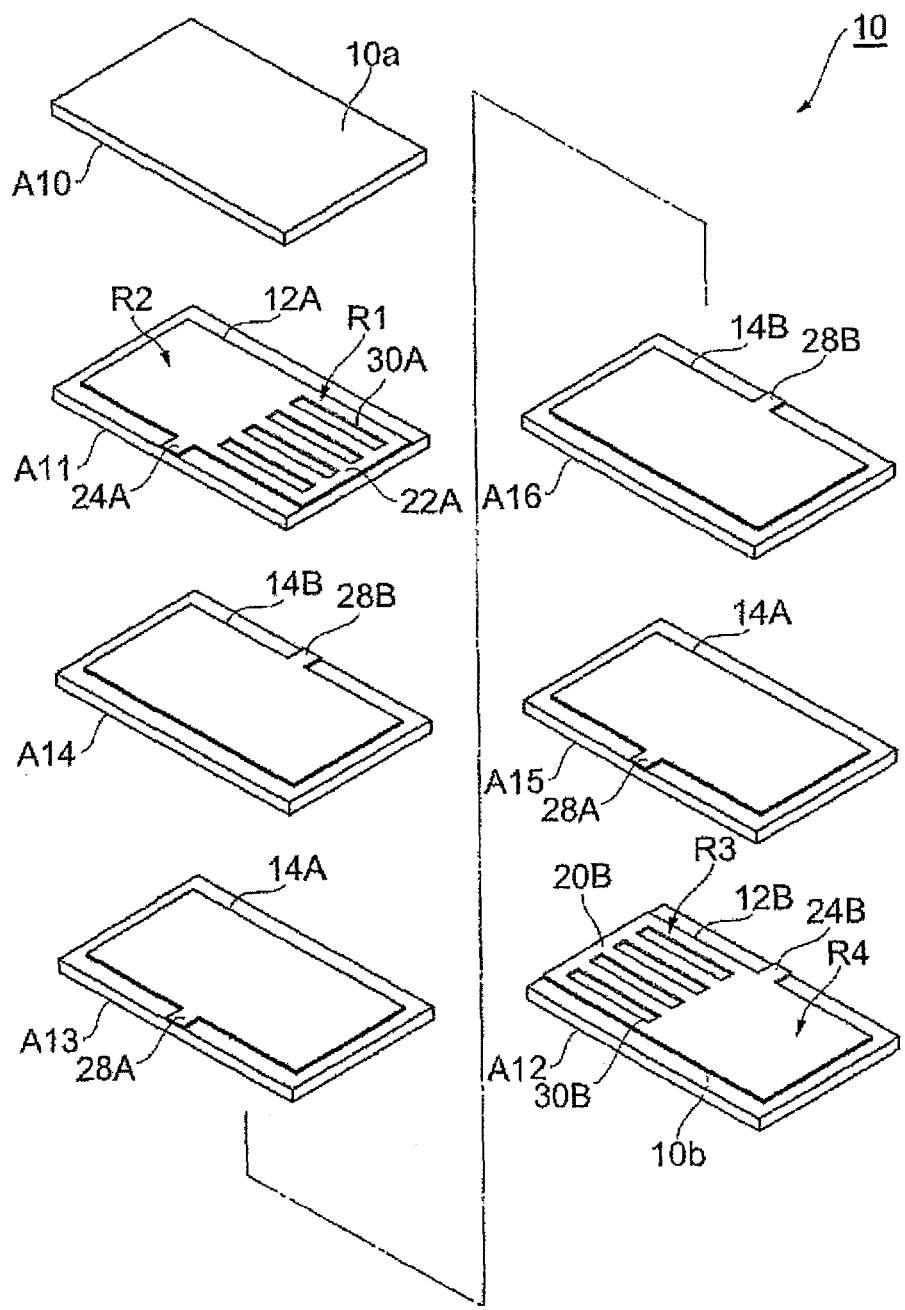
FIG. 6 is an exploded perspective view illustrating still another example (second example) of the dielectric matrix constituting the multilayer capacitor in accordance with the first embodiment.

The inner electrodes 14A, 14B may be arranged between a set of inner electrodes 12A, 12B as illustrated in FIG. 6.

Though the regions R1, R3 of the inner electrodes 12A, 12B are provided with the respective pluralities of square openings 26A, 26B, the openings 26A, 26B may have various forms such as polygonal (triangular, quadrangular, etc.), circular, elliptical, and elongated holes. For example, as illustrated in FIG. 6, the region R1 of the inner electrode 12A may be provided with a plurality of (4 in FIG. 6) rectangular (slit-like) openings 30A, while the region R3 of the inner electrode 12B may be provided with a plurality of (4 in FIG. 6) rectangular (slit-like) openings 30B. In FIG. 6, the openings 30A are provided in the region R1 such that their longitudinal direction extends in a direction along which the regions R1, R2 are arranged in a row, the openings 30B are provided in the region R3 such that their longitudinal direction extends in a direction along which the regions R3, R4 are arranged in a row, and a plurality of openings 30A, 30B are arranged in a row along the opposing direction of the side faces 10c, 10d. Without being restricted to the above, however, the effect of inhibiting the impedance from lowering near the resonance frequency can be obtained as long as the region R1 has an area smaller than that of the region R4 while the region R3 has an area smaller than that of the region R2.

If the linear distance between the main face 10a and the inner electrode 12A differs from that between the main face 10b and the inner electrode 12B, a current flow path may vary according to whether the multilayer capacitor 1 is mounted to a circuit board by using the main face 10a or 10b as a mounting surface, whereby the high-frequency characteristic may change depending on the state in which the multilayer capacitor 1 is mounted to the circuit board. When the linear distance from the main face 10a to the inner electrode 12A is substantially the same as that from the main face 10b to the inner electrode 12B, i.e., the thickness of the dielectric layer A10 is substantially the same as that of the dielectric layer A12, as illustrated in FIG. 6, by contrast, there is hardly any fear of changing the high-frequency characteristic. Since the multilayer capacitor is an industrial product and may incur errors within a certain tolerance, "substantially the same" herein encompasses the sameness within the tolerance in the industrial product.

Figure 7:
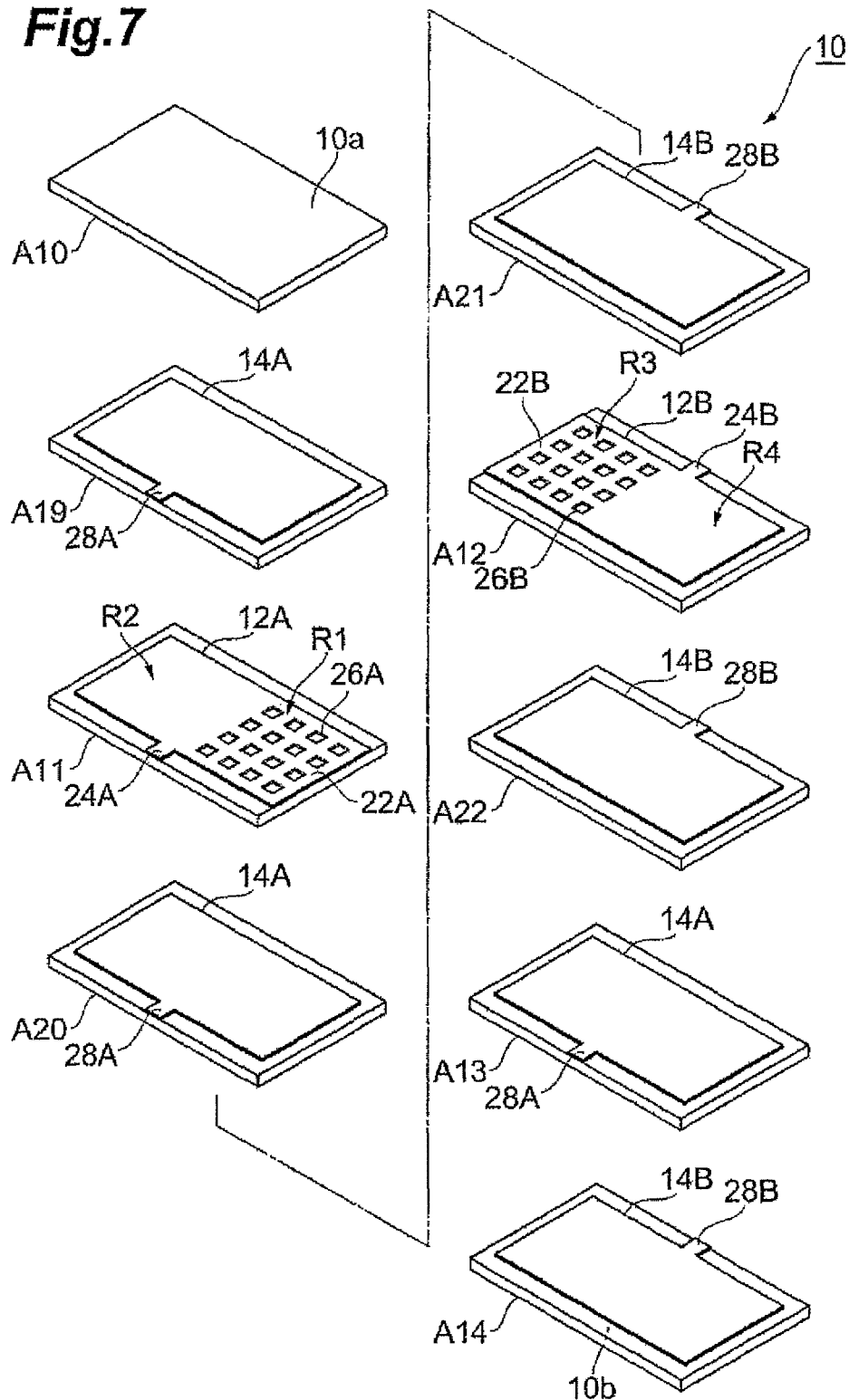
FIG. 7 is an exploded perspective view illustrating a further example (third example) of the dielectric matrix constituting the multilayer capacitor in accordance with the first embodiment.

Though a set of inner electrodes 12A, 12B are adjacent to each other in the laminating direction in the first embodiment, the inner electrodes 14A may be arranged adjacent to the inner electrode 12A, which is homopolar therewith, on both sides in the laminating direction, while the inner electrodes 14B may be arranged adjacent to the inner electrode 12B, which is homopolar therewith, on both sides in the laminating direction as illustrated in FIG. 7. In this case, the presence of the inner electrodes 14A, which are homopolar with the inner electrode 12A connected to the terminal electrode 18A, keeps the inner electrode 12A from opposing the heteropolar inner electrodes 14B in a neighboring manner in the laminating direction, while the presence of the inner electrodes 14B, which are homopolar with the inner electrode 12B connected to the terminal electrode 18B, keeps the inner electrode 12B from opposing the heteropolar inner electrodes 14A in a neighboring manner in the laminating direction. This is favorable in that the parasitic capacitance can further be lowered as a result.

In FIG. 7, the dielectric matrix 10 is constructed by laminating the dielectric layers A10, A19, A11, A20, A21, A12, A22, A13, A14 in succession, while the inner electrodes 12A, 12B, 14A, 14B are laminated within the dielectric matrix 10 in the order of the inner electrodes 14A, 12A, 14A, 14B, 12B, 14B, 14A, 14B alternately with the dielectric layers A19, A11, A20, A21, A12, A22, A13.

The inner electrodes 14A, 14B and dielectric layers may have any numbers as desired.

Second Embodiment

Figure 1:
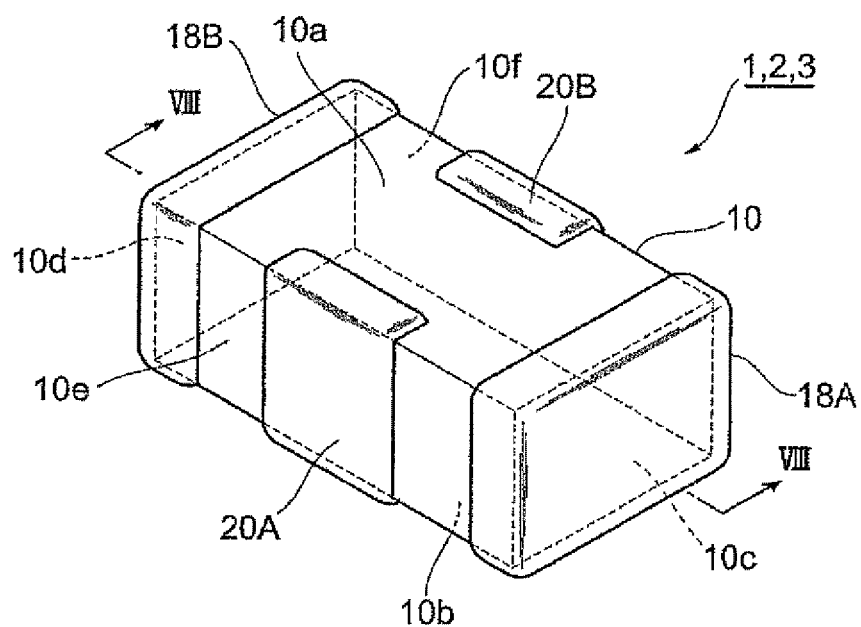
FIG. 1 is a perspective view illustrating a multilayer capacitor in accordance with first to third embodiments.
Figure 8:
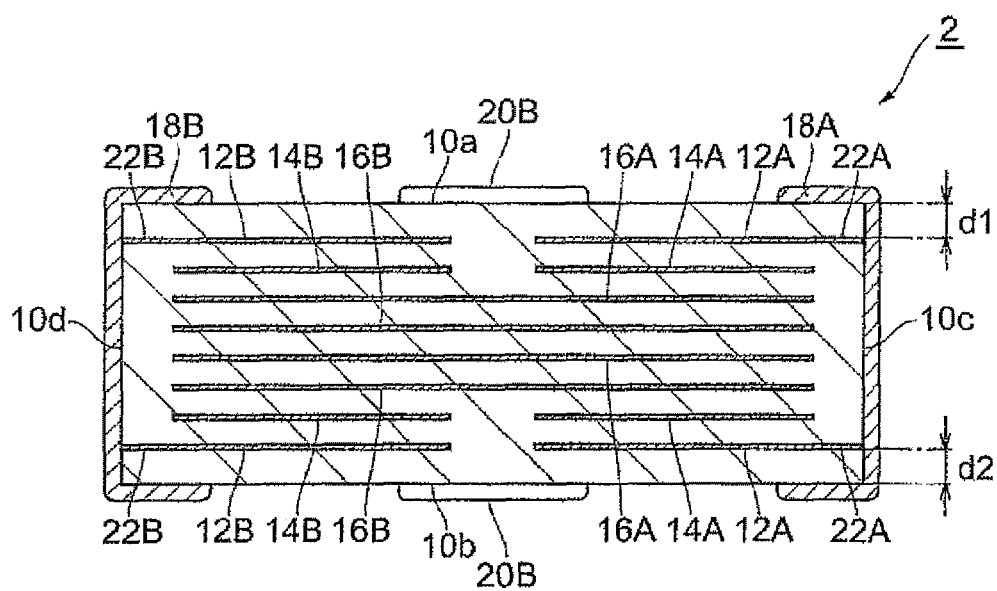
FIG. 8 is a sectional view of a multilayer capacitor in accordance with the second embodiment taken along the line VIII-VIII of FIG. 1.
Figure 9:
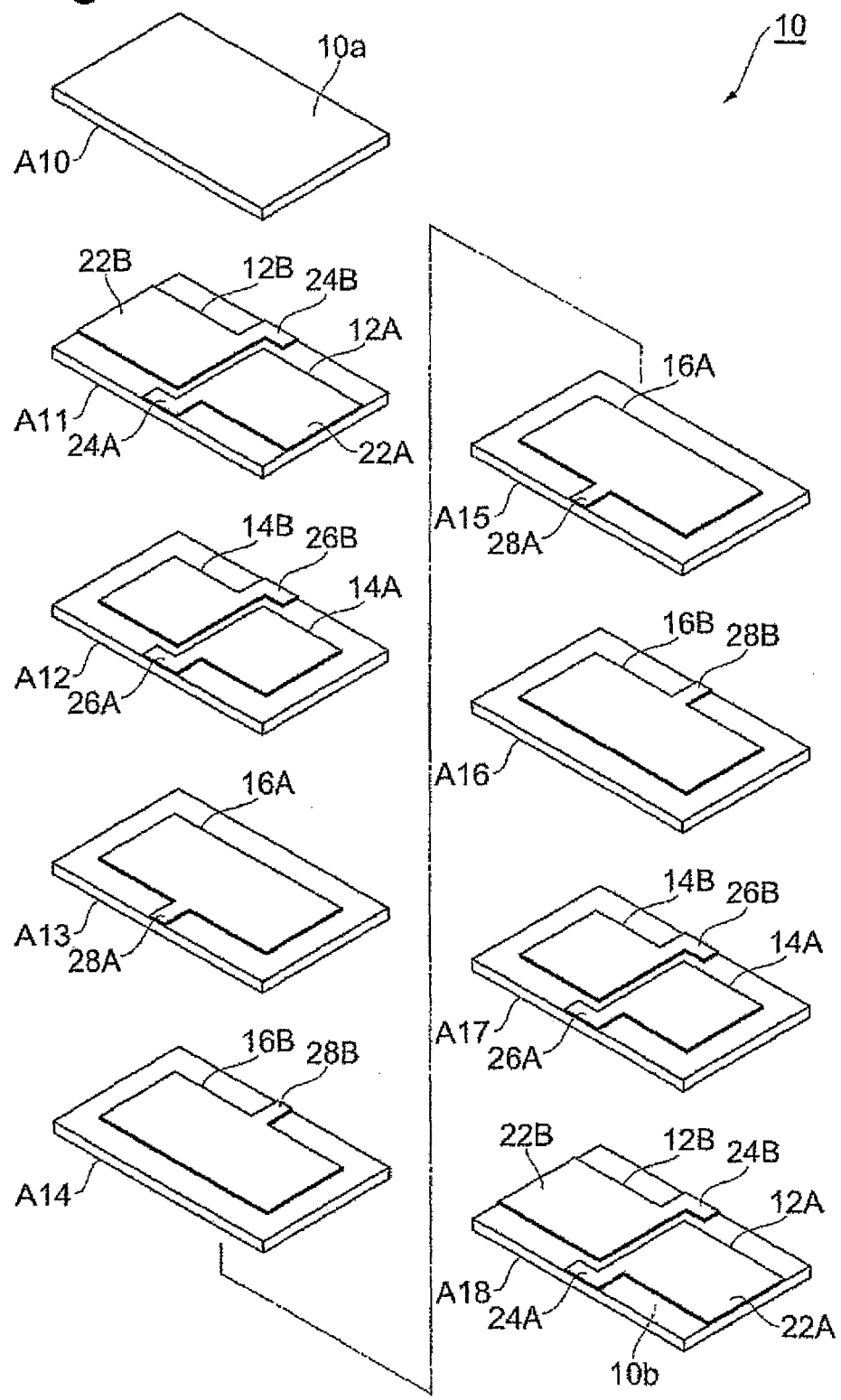
FIG. 9 is an exploded perspective view illustrating the multilayer capacitor in accordance with the second embodiment.

With reference to FIGS. 1, 8 and 9, the structure of a multilayer capacitor 2 in accordance with the second embodiment will be explained. The multilayer capacitor 2 comprises a dielectric matrix (matrix) 10 having a rectangular parallelepiped form; inner electrodes 12A (first and eighth inner electrodes), 12B (second and ninth inner electrodes), 14A (fifth and sixth inner electrodes), 14B (third and seventh inner electrodes), 16A (fourth inner electrodes), and 16B (tenth inner electrodes); terminal electrodes 18A, 18B (first and second terminal electrodes); and linking electrodes 20A, 20B (first and second linking electrodes).

The dielectric matrix 10 has main faces 10a, 10b opposing each other, side faces 10c, 10d opposing each other, and side faces 10e, 10f opposing each other. In the second embodiment, the main face 10a or 10b is a mounting surface opposing the main face of a circuit board (not illustrated).

The side faces 10c, 10d extend so as to connect the main faces 10a, 10b and side faces 10e, 10f. The side faces 10e, 10f extend so as to connect the main faces 10a, 10b and side faces 10c, 10d. In the second embodiment, the length in the longitudinal direction, width, and thickness of the dielectric matrix 10 can be set to about 1.0 mm, about 0.5 mm, and about 0.5 mm, respectively, for example. Since the dielectric matrix 10 is typically barrel-polished after firing, ridge parts of the dielectric matrix 10 exhibit curved surfaces with a predetermined curvature (not illustrated).

As illustrated in FIG. 9, the dielectric matrix 10 is constructed by laminating dielectric layers A10 to A18, each having a rectangular form, in succession. Hence, the upper face of the dielectric layer A10 constitutes the main face 10a of the dielectric matrix 10, the lower face of the dielectric layer A18 constitutes the main face 10h of the dielectric matrix 10, and the opposing direction of the main faces 10a, 10b (hereinafter referred to as opposing direction) coincides with the laminating direction of the dielectric matrix 10 (dielectric layers A10 to A18) (hereinafter referred to as laminating direction) in the second embodiment.

The dielectric layers A10 to A18 function as insulators having an electric insulation property. The dielectric layers A10 to A18 can be formed by a dielectric ceramic material in which barium titanate or strontium titanate is doped with a rare-earth element, for example. In practice, the dielectric matrix 10 is integrated by firing to such an extent that boundaries between the dielectric layers A10 to A18 are indiscernible.

A pair of the inner electrodes 12A, 12B, each having a rectangular form, are formed on a surface of each of the dielectric layers A11, A18 while being separated from each other. The inner electrode 12A is arranged in a region of the dielectric layer A11, A18 located closer to the side face 10c (a region located closer to the side face 10c than is the center in the longitudinal direction of the dielectric layer A11, A18 in the second embodiment), while the inner electrode 12B is arranged in a region of the dielectric layer A11, A18 located closer to the side face 10d (a region located closer to the side face 10d than is the center in the longitudinal direction of the dielectric layer A11, A18 in the second embodiment).

The inner electrode 12A is integrally provided with a terminal connection part 22A (first or third terminal connection part) at a shorter side facing the side face 10c. The terminal connection part 22A has the same width as that of the inner electrode 12A and is drawn to an edge on a side of the dielectric layer A11, A18 formed with the terminal electrode 18A, so that an end portion thereof is exposed at the side face 10c. The inner electrode 12A is also integrally provided with a linking connection part 24A (first or eighth linking connection part) joined to a corner portion closer to the side faces 10d, 10e. The linking connection part 24A has a width sufficiently smaller than that of the inner electrode 12A and is drawn to an edge of the dielectric layer A11, A18 on a side formed with the linking electrode 20A, so that an end portion thereof is exposed at the side face 10e.

The inner electrode 12B is integrally provided with a terminal connection part 22B (second or fourth terminal connection part) at a shorter side facing the side face 10d. The terminal connection part 22B has the same width as that of the inner electrode 12B and is drawn to an edge on a side of the dielectric layer A11, A18 formed with the terminal electrode 18B, so that an end portion thereof is exposed at the side face 10d. The inner electrode 12B is also integrally provided with a linking connection part 24B (first or ninth linking connection part) joined to a corner portion closer to the side faces 10c, 10f. The linking connection part 24B has a width sufficiently smaller than that of the inner electrode 12B and is drawn to an edge of the dielectric layer A11, A18 on a side formed with the linking electrode 20B, so that an end portion thereof is exposed at the side face 10f.

A pair of the inner electrodes 14A, 14B, each having a rectangular form, are formed on a surface of each of the dielectric layers A12, A17 while being separated from each other. The inner electrode 14A is arranged in a region of the dielectric layer A12, A17 located closer to the side face 10c (a region located closer to the side face 10c than is the center in the longitudinal direction of the dielectric layer A12, A17 in the second embodiment), while the inner electrode 14B is arranged in a region of the dielectric layer A12, A17 located closer to the side face 10*d* (a region located closer to the side face 10*d* than is the center in the longitudinal direction of the dielectric layer A12, A17 in the second embodiment).

The inner electrode 14A is also integrally provided with a linking connection part 26A (third or sixth linking connection part) joined to a corner portion closer to the side faces 10*d*, 10*e*. The linking connection part 26A has a width sufficiently smaller than that of the inner electrode 14A and is drawn to an edge of the dielectric layer A12, A17 on a side formed with the linking electrode 20A, so that an end portion thereof is exposed at the side face 10*e*.

The inner electrode 14B is also integrally provided with a linking connection part 26B (fifth or seventh linking connection part) joined to a corner portion closer to the side faces 10*c*, 10*f*. The linking connection part 26B has a width sufficiently smaller than that of the inner electrode 14B and is drawn to an edge of the dielectric layer A12, A17 on a side formed with the linking electrode 20B, so that an end portion thereof is exposed at the side face 10*f*.

The inner electrode 16A having a rectangular shape is formed on a surface of each of the dielectric layers A13, A15. The inner electrode 16A extends in the opposing direction of the side faces 10*c*, 10*d*. The inner electrode 16A is integrally provided with a linking connection part 28A (fourth linking connection part) at a center portion of a longer side facing the side face 10*e*. The linking connection part 28A has a width sufficiently smaller than that of the inner electrode 16A and is drawn to an edge of the dielectric layer A13, A15 on a side formed with the linking electrode 20A, so that an end portion thereof is exposed at the side face 10*e*.

The inner electrode 16B having a rectangular shape is formed on a surface of each of the dielectric layers A14, A16. The inner electrode 16B extends in the opposing direction of the side faces 10*c*, 10*d*. The inner electrode 16B is integrally provided with a linking connection part 28B (fourth linking connection part) at a center portion of a longer side facing the side face 10*f*. The linking connection part 28B has a width sufficiently smaller than that of the inner electrode 16B and is drawn to an edge of the dielectric layer A14, A16 on a side formed with the linking electrode 20B, so that an end portion thereof is exposed at the side face 10*f*.

The inner electrodes 12A, 12B, 14A, 14B, 16A, 16B, each of which is arranged within the dielectric matrix 10, are laminated in the order of the inner electrodes 12A and 12B, 14A and 14B, 16A, 16B, 16A, 16B, 14A and 14B, and 12A and 12B alternately with the dielectric layers A11 to A17. Hence, the inner electrodes 12A, 12B, 14A, 14B, 16A, 16B are arranged within the dielectric matrix 10, while those adjacent to each other in the laminating direction (opposing direction of the main faces 10*a*, 10*b*) are separated from each other by the thickness of their corresponding dielectric layers A11 to A18. Here, as illustrated in FIG. 8, the distance d1 from the main face 10*a* to its closest inner electrodes 12A, 12B is substantially the same as the distance d2 from the main face 10*b* to its closest inner electrodes 12A, 12B.

The inner electrodes 12A, 14A, 16A, 16B overlap one another as seen in the laminating direction. More specifically, the inner electrodes 12A, 14A, regions of the inner electrodes 16A which are located closer to the side face 10*c* than is the center in the longitudinal direction of the dielectric layers, and regions of the inner electrodes 16B which are located closer to the side face 10*c* than is the center in the longitudinal direction of the dielectric layers overlap one another as seen in the laminating direction.

The inner electrodes 12B, 14B, 16A, 16B overlap one another as seen in the laminating direction. More specifically, the inner electrodes 12B, 14B, regions of the inner electrodes 16A which are located closer to the side face 10*d* than is the center in the longitudinal direction of the dielectric layers, and regions of the inner electrodes 16B which are located closer to the side face 10*d* than is the center in the longitudinal direction of the dielectric layers overlap one another as seen in the laminating direction.

On the other hand, the inner electrodes 12A overlap none of the inner electrodes 12B, 14B as seen in the laminating direction. The inner electrodes 12B overlap none of the inner electrodes 12A, 14A as seen in the laminating direction.

Therefore, the capacitance of the multilayer capacitor 2 is defined by the opposing area of the inner electrodes 16A, 16B as seen in the laminating direction and the gap between the inner electrodes 16A, 16B (i.e., the thickness of the dielectric layers A13 to A15), the opposing area of the inner electrodes 14A, 16B as seen in the laminating direction and the gap between the inner electrodes 14A, 16B (i.e., the thickness of the dielectric layer A16), and the opposing area of the inner electrodes 14B, 16A as seen in the laminating direction and the gap between the inner electrodes 14B, 16A (i.e., the thickness of the dielectric layer A12).

The inner electrodes 12A, 12B, 14A, 14B, 16A, 16B are made of a conductive material such as Ag or Ni, for example. The inner electrodes 12A, 12B, 14A, 14B, 16A, 16B are constructed as sintered bodies of a conductive paste containing the above-mentioned conductive material.

The terminal electrode 18A is formed such as to cover the side face 10*c* of the dielectric matrix 10 and protrude onto the main faces 10*a*, 10*b* and side faces 10*e*, 10*f* adjacent to the side face 10*c*. Hence, the terminal electrode 18A is arranged on the side face 10*c* and portions of the main faces 10*a*, 10*b* and side faces 10*e*, 10*f* which are closer to the side face 10*e*. The terminal electrode 18A is connected physically and electrically to the terminal connection parts 22A each having an end portion exposed at the side face 10*c*. Therefore, the terminal electrode 18A is electrically connected to the inner electrodes 12A.

The terminal electrode 18B is formed such as to cover the side face 10*d* of the dielectric matrix 10 and protrude onto the main faces 10*a*, 10*b* and side faces 10*e*, 10*f* adjacent to the side face 10*d*. Hence, the terminal electrode 18B is arranged on the side face 10*d* and portions of the main faces 10*a*, 10*b* and side faces 10*e*, 10*f* which are closer to the side face 10*d*. The terminal electrode 18B is connected physically and electrically to the terminal connection parts 22B each having an end portion exposed at the side face 10*d*. Therefore, the terminal electrode 18B is electrically connected to the inner electrodes 12B.

The linking electrode 20A is shaped rectangular and formed such as to partly cover the side face 10*e* of the dielectric matrix 10 and protrude onto the main faces 10*a*, 10*b* adjacent to the side face 10*e*. Hence, the linking electrode 20A is arranged on the side face 10*e* and portions of the main faces 10*a*, 10*b* which are closer to the side face 10*e*. The linking electrode 20A is connected physically and electrically to the linking connection parts 24A, 26A, 28A having end portions exposed at the side face 10*e*. Therefore, the inner electrodes 12A, 14A, 16A are electrically connected together through the linking electrode 20A. That is, the inner electrodes 12A, 14A, 16A become homopolar.

The linking electrode 20B is shaped rectangular and formed such as to partly cover the side face 10*f* of the dielectric matrix 10 and protrude onto the main faces 10*a*, 10*b* adjacent to the side face 10*f*. Hence, the linking electrode 20B is arranged on the side face 10*f* and portions of the main faces 10*a*, 10*b* which are closer to the side face 10*f*. The linking electrode 20B is connected physically and electrically to the linking connection parts 24B, 26B, 28B having end portions exposed at the side face 10f. Therefore, the inner electrodes 12B, 14B, 16B are electrically connected together through the linking electrode 20B. That is, the inner electrodes 12B, 14B, 16B become homopolar.

The terminal electrodes 18A, 18B and linking electrodes 20A, 20B are fainted by applying and burning a conductive paste containing a conductive metal powder and glass frit onto their corresponding outer surfaces of the dielectric matrix 10, for example. Plating layers may be formed on the terminal electrodes 18A, 18B and linking electrodes 20A, 20B when necessary.

In the foregoing second embodiment, the inner electrode 12A is integrally provided with the terminal connection part 22A connected to the terminal electrode 18A and the linking connection part 24A connected to the linking electrode 20A, the inner electrode 14A is integrally provided with the linking connection part 26A connected to the linking electrode 20A, the inner electrode 14B is integrally provided with the linking connection part 26B connected to the linking electrode 20B, the inner electrodes 12A, 14A, which are homopolar with each other, overlap each other as seen in the laminating direction, and the inner electrodes 12A, 14B, which are heteropolar to each other, do not overlap each other as seen in the laminating direction. Therefore, the inner electrode 12A in which the resistance component ESR (see FIG. 4) of the multilayer capacitor 2 occurs when a current flows does not oppose any heteropole in a neighboring manner on the side adjacent to the inner electrode 14A, whereby the parasitic capacitance Cp (see FIG. 4) connected in parallel to the resistance component of the multilayer capacitor 2 becomes smaller. Also, in the second embodiment, the inner electrode 12B is integrally provided with the terminal connection part 22B connected to the terminal electrode 18B and the linking connection part 24B connected to the linking electrode 20B, the inner electrode 14B is integrally provided with the linking connection part 26B connected to the linking electrode 20B, the inner electrode 14A is integrally provided with the linking connection part 26A connected to the linking electrode 20A, the inner electrodes 12B, 14B, which are homopolar with each other, overlap each other as seen in the laminating direction, and the inner electrodes 12B, 14A, which are heteropolar to each other, do not overlap each other as seen in the laminating direction. Therefore, the inner electrode 12B in which the resistance component ESR (see FIG. 4) of the multilayer capacitor 2 occurs when a current flows does not oppose any heteropole in a neighboring manner on the side adjacent to the inner electrode 14A, whereby the parasitic capacitance Cp (see FIG. 4) connected in parallel to the resistance component of the multilayer capacitor 2 becomes smaller. As a result, as illustrated by the solid line a in FIG. 3, the impedance can be inhibited from decreasing near the resonance frequency, whereby impedance fluctuations are suppressed over a broad bandwidth including the vicinity of the resonance frequency.

In the second embodiment, the inner electrodes 12A, 12B, which are heteropolar to each other, are arranged on the same dielectric layers A11, A18, while the inner electrodes 14A, 14B, which are heteropolar to each other, are arranged on the same dielectric layers A12, A17. As a result, the number of laminations of dielectric layers constituting the dielectric matrix 10 decreases, whereby the multilayer capacitor 2 can be made smaller.

In the second embodiment, the inner electrode 14A is integrally provided with the linking connection part 26A connected to the linking electrode 20A, the inner electrode 16B is integrally provided with the linking connection part 28B connected to the linking electrode 20B, and the inner electrodes 14A, 16B oppose each other in a neighboring manner in the laminating direction. The inner electrode 14B is integrally provided with the linking connection part 26B connected to the linking electrode 20B, the inner electrode 16B is integrally provided with the linking connection part 28B connected to the linking electrode 20B, and the inner electrodes 14A, 16B oppose each other in a neighboring manner in the laminating direction. Therefore, the capacity component C (see FIG. 4) occurs between the inner electrodes 14A, 16B connected to none of the terminal electrodes 18A, 18B and between the inner electrodes 14B, 16A connected to none of the terminal electrodes 18A, 18B. This, together with the fact that the inner electrodes 14A, 14B, which are heteropolar to each other, are arranged on the same dielectric layer A12, and the inner electrodes 14A, 14B, which are heteropolar to each other, are arranged on the same dielectric layer A17 as mentioned above, can increase the total capacitance of the multilayer capacitor 2 while making the multilayer capacitor 2 smaller. As a result, the impedance can be decreased over the whole low-frequency band as illustrated by the dash-double-dot line c2 in FIG. 3.

In the second embodiment, the dielectric layers A11, A12 and A13 are laminated in this order, the inner electrodes 12A, 12B are adjacent to the inner electrodes 14A, 14B in the laminating direction, and the inner electrodes 14A, 14B are adjacent to the inner electrode 16A in the laminating direction. Hence, the inner electrode 12B electrically connected to the terminal electrode 18B is not adjacent to its heteropolar inner electrode 16A in the laminating direction. Also, the dielectric layers A16, A11 and A18 are laminated in this order, the inner electrode 16B is adjacent to the inner electrodes 14A, 14B in the laminating direction, and the inner electrodes 14A, 14B are adjacent to the inner electrodes 12A, 12B in the laminating direction. Hence, the inner electrode 12A electrically connected to the terminal electrode 18A is not adjacent to its heteropolar inner electrode 16B in the laminating direction. Further, in the second embodiment, the inner electrodes 12A, 14A overlap each other as seen in the laminating direction, the inner electrodes 12B, 14B overlap each other as seen in the laminating direction, the inner electrodes 12A, 14B do not overlap each other as seen in the laminating direction, the inner electrodes 12B, 14A do not overlap each other as seen in the laminating direction, the inner electrodes 14B, 16A overlap each other as seen in the laminating direction, and the inner electrodes 14A, 16B overlap each other as seen in the laminating direction. Therefore, the presence of the inner electrodes 14A, which are homopolar with the inner electrodes 12A connected to the terminal electrode 18A, keeps the inner electrodes 12A from opposing their heteropolar inner electrodes 16B in a neighboring manner in the laminating direction, while the presence of the inner electrodes 14B, which are homopolar with the inner electrodes 12B connected to the terminal electrode 18B, keeps the inner electrodes 12B from opposing their heteropolar inner electrodes 16A in a neighboring manner in the laminating direction. As a result, the parasitic capacitance can further be lowered.

In the second embodiment, the distance d1 from the main face 10a to its closest inner electrodes 12A, 12B is substantially the same as the distance d2 from the main face 10b to its closest inner electrodes 12A, 12B. Therefore, a current flow path does not vary according to whether the multilayer capacitor 2 is mounted to a circuit board by using the main face 10a or 10b as a mounting surface. As a result, there is hardly any fear of changing the high-frequency characteristic.

Since the multilayer capacitor is an industrial product and may incur errors within a certain tolerance, "substantially the same" herein encompasses the sameness within the tolerance in the industrial product.

Though a preferred embodiment of the present invention is explained in detail in the foregoing, the present invention is not limited to the above-mentioned embodiment. For example, though two sets of inner electrodes 12A, 12B positioned on the same dielectric layers and two sets of inner electrodes 14A, 14B positioned on the same dielectric layers are arranged within the dielectric matrix 10, one set of inner electrodes 12A, 12B may be arranged within the dielectric matrix 10 as illustrated in FIG. 10 or three or more sets of inner electrodes 12A, 12B may be arranged therewithin (not illustrated).

Figure 11:
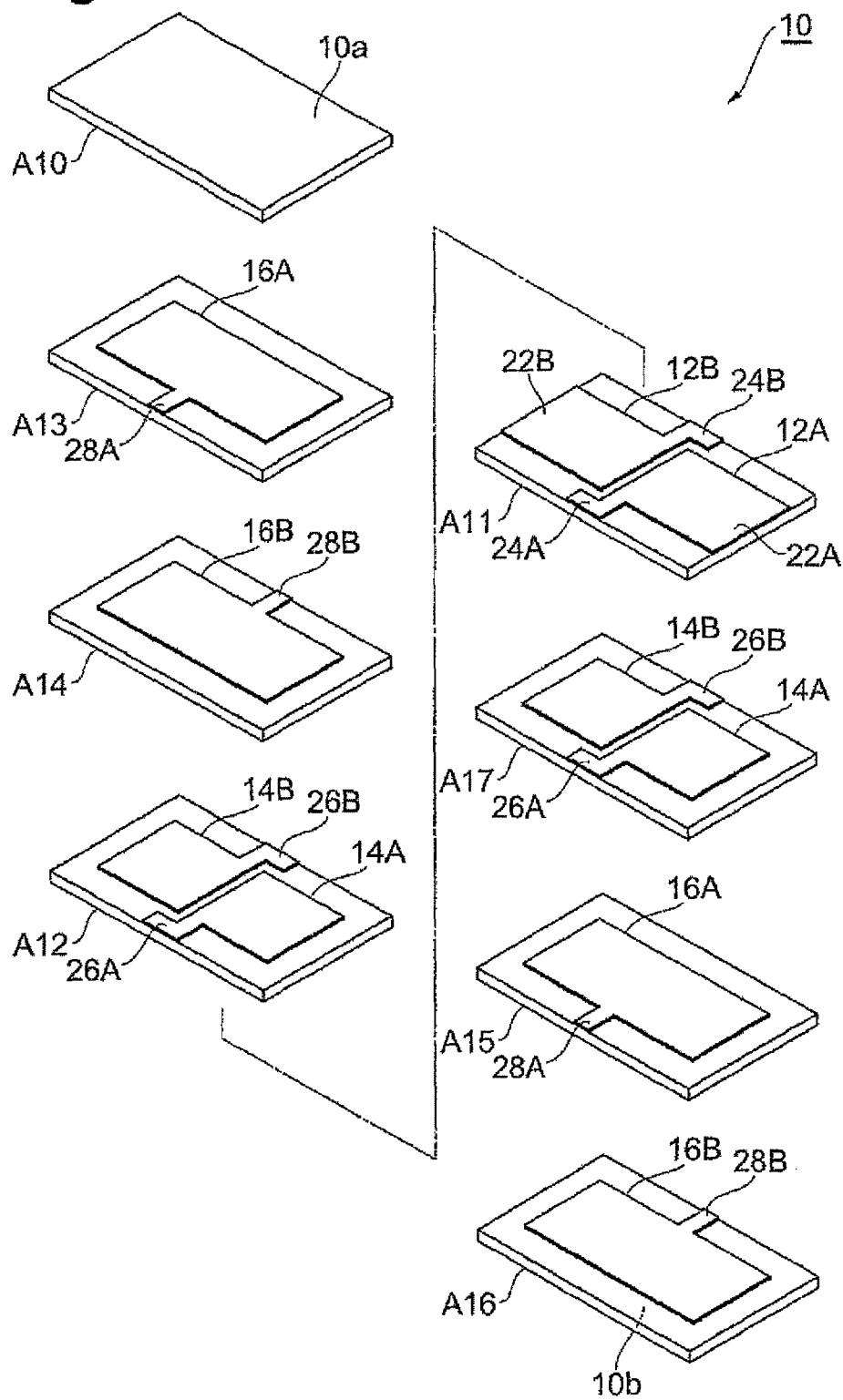
FIG. 11 is an exploded perspective view illustrating still another example (second example) of the dielectric matrix constituting the multilayer capacitor in accordance with the second embodiment.

As illustrated in FIG. 11, one set of inner electrodes 12A, 12B and two sets of inner electrodes 14A, 14B may be arranged within the dielectric matrix 10.

Figure 10:
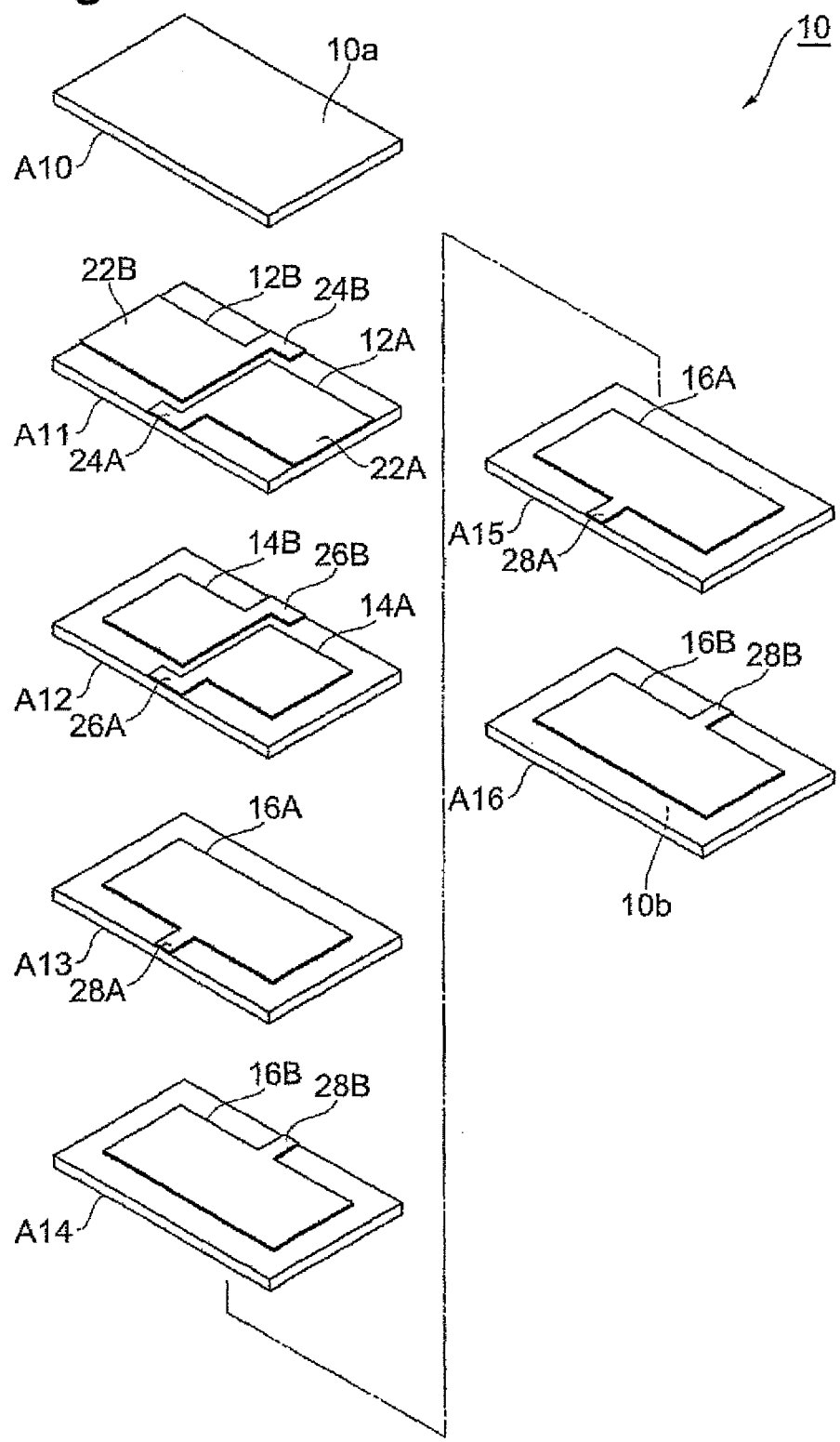
FIG. 10 is an exploded perspective view illustrating another example (first example) of the dielectric matrix constituting the multilayer capacitor in accordance with the second embodiment.

In FIG. 10, the dielectric matrix 10 is constructed by laminating dielectric layers A10 to A16 in succession, while the inner electrodes 12A, 12B, 14A, 14B, 16A, 16B are laminated within the dielectric matrix 10 in the order of the inner electrodes 12A and 12B, 14A and 14B, 16A, 16B, 16A, and 16B alternately with the dielectric layers A11 to A15. In FIG. 11, the dielectric matrix 10 is constructed by laminating dielectric layers A10, A13, A14, A12, A11, A17, A15, A16 in succession, while the inner electrodes 12A, 12B, 14A, 14B, 16A, 16B are laminated within the dielectric matrix 10 in the order of the inner electrodes 16A, 16B, 14A and 14B, 12A and 12B, 14A and 14B, 16A, and 16B alternately with the dielectric layers A13, A14, A12, A11, A17, A15.

Hence, in FIG. 11, sets of the inner electrodes 14A and 14B, 12A and 12B, and 14A and 14B are adjacent to one another in the laminating direction, so that the inner electrodes 14A, 12A, 14A, which are homopolar with each other, overlap one another as seen in the laminating direction, and the inner electrodes 14B, 12B, 14B, which are homopolar with each other, overlap one another as seen in the laminating direction. In this case, the presence of the inner electrodes 14A, which are homopolar with the inner electrode 12A connected to the terminal electrode 18A, keeps the inner electrode 12A from opposing its heteropolar inner electrodes 16B in a neighboring manner in the laminating direction, while the presence of the inner electrodes 14B, which are homopolar with the inner electrode 12B connected to the terminal electrode 18B, keeps the inner electrode 12B from opposing its heteropolar inner electrodes 16A in a neighboring manner in the laminating direction. As a result, the parasitic capacitance can further be lowered. Also, in FIG. 11, the distance from the main face 10a to the inner electrodes 12A, 12B is substantially the same as that from the main face 10b to the inner electrodes 12A, 12B, whereby there is hardly any fear of changing the high-frequency characteristic.

Figure 12:
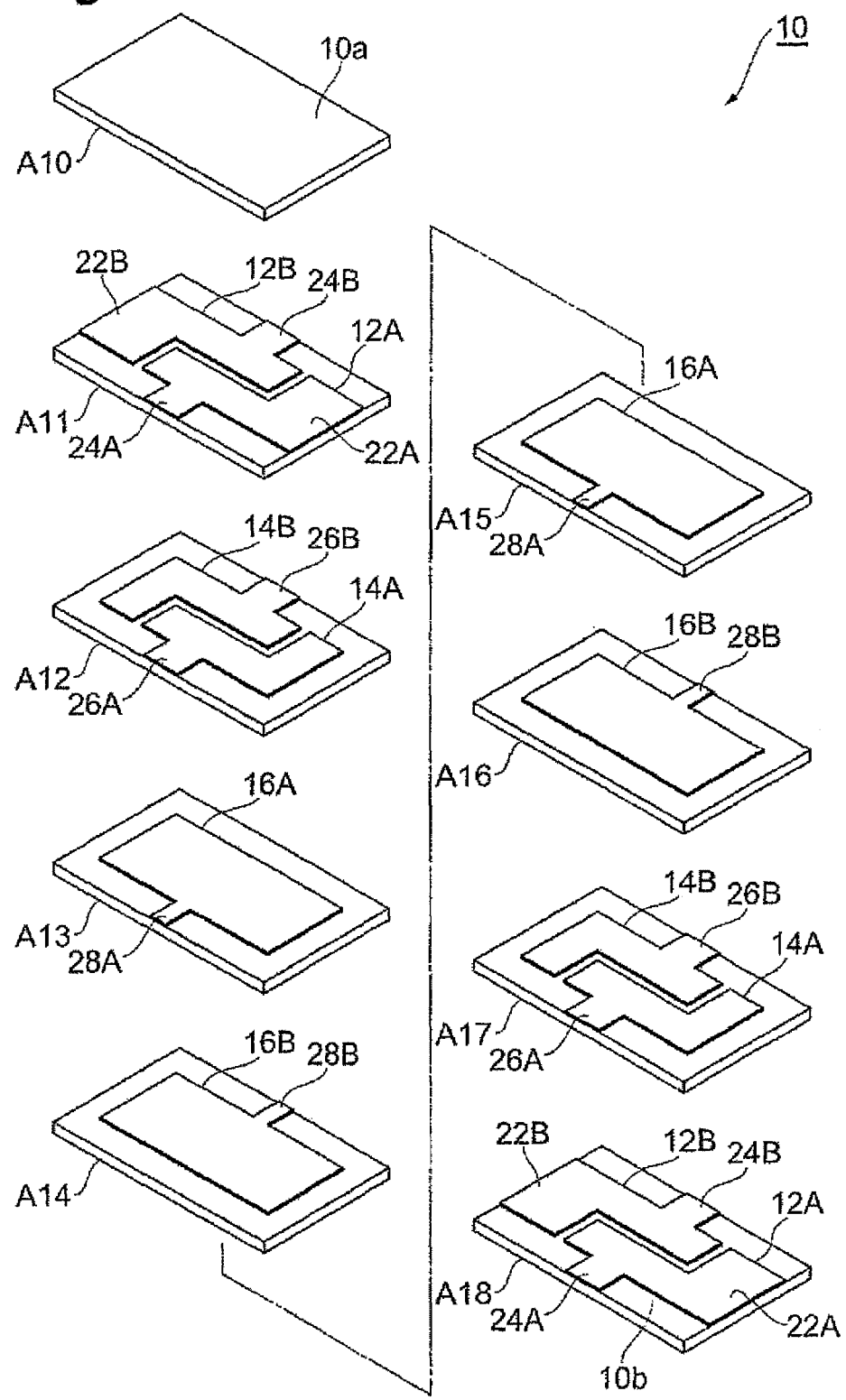
FIG. 12 is an exploded perspective view illustrating a further example (third example) of the dielectric matrix constituting the multilayer capacitor in accordance with the second embodiment.

As long as the inner electrodes 12A, 12B, which are heteropolar to each other, do not overlap each other as seen in the laminating direction of a plurality of dielectric layers, while the inner electrodes 14A, 16B, which are heteropolar to each other, overlap each other as seen in the laminating direction of a plurality of dielectric layers, the inner electrodes 12A, 12B, 14A, 14B may be changed into various forms as illustrated in FIG. 12, for example, as a matter of course.

In FIG. 12, each of the inner electrodes 12A is shaped like letter L and arranged such as to extend over a region located closer to the side face 10c than is the center in the longitudinal direction of the dielectric layer A11, A18 and a region located closer to the side face 10e than is the center in the transverse direction of the dielectric layer A11, A18. Each of the inner electrodes 12B is shaped like letter L and arranged such as to extend over a region located closer to the side face 10d than is the center in the longitudinal direction of the dielectric layer A11, A18 and a region located closer to the side face 10f than is the center in the transverse direction of the dielectric layer A11, A18. Each of the inner electrodes 14A is shaped like letter L and arranged such as to extend over a region located closer to the side face 10c than is the center in the longitudinal direction of the dielectric layer A12, A11 and a region located closer to the side face 10e than is the center in the transverse direction of the dielectric layer A12, A17. Each of the inner electrodes 14B is shaped like letter L and arranged such as to extend over a region located closer to the side face 10d than is the center in the longitudinal direction of the dielectric layer A12, A17 and a region located closer to the side face 10f than is the center in the transverse direction of the dielectric layer A12, A17.

Figure 13:
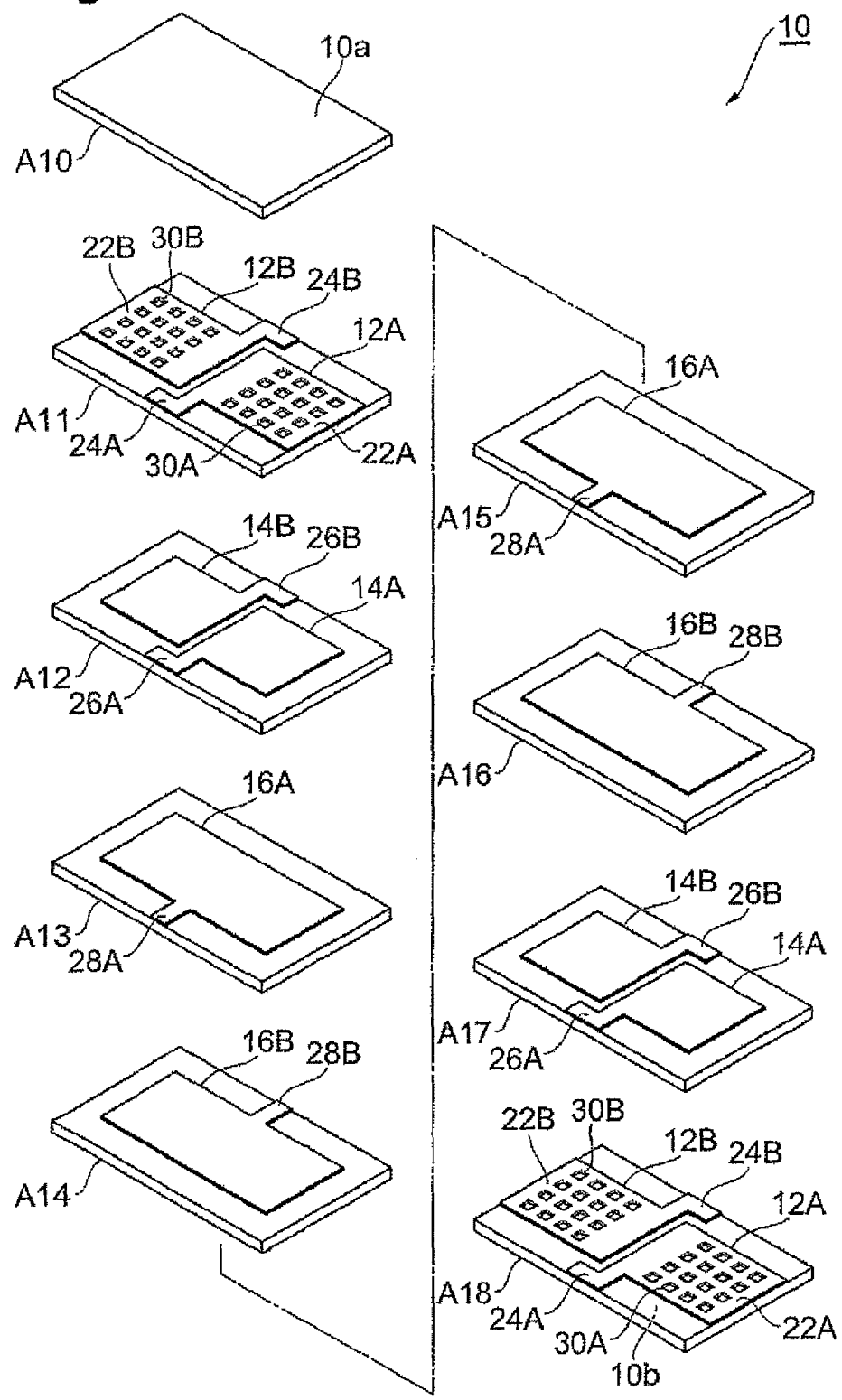
FIG. 13 is an exploded perspective view illustrating a still further example (fourth example) of the dielectric matrix constituting the multilayer capacitor in accordance with the second embodiment.

As illustrated in FIG. 13, each inner electrode 12A may be provided with a plurality of openings 30A each having a square form, while each inner electrode 12B may be provided with a plurality of openings 30B each having a square form. Each set of the openings 30A, 30B are arranged in a matrix of four by four, i.e., so as to form a mesh (net), in their corresponding inner electrode 12A, 12B. The openings 30A, 30B may have various forms such as polygonal (triangular, quadrangular, etc.), circular, elliptical, and elongated holes. In this case, even when the inner electrode 12A opposes its heteropolar inner electrode 16B in the laminating direction, their opposing area becomes smaller, and even when the inner electrode 12B opposes its heteropolar inner electrode 16A in the laminating direction, their opposing area becomes smaller. As a result, the parasitic capacitance can further be lowered.

For reducing the opposing area of the inner electrode 12A and its heteropolar inner electrode 16B and the opposing area of the inner electrode 12B and its heteropolar inner electrode 16A, the inner electrodes 12A, 12B may be formed into a single thin line, for example. In this case, however, a current flows through the single thin line part in a concentrated manner, thereby increasing equivalent series inductance (ESL). The ESL is connected in series to the capacitance C in the equivalent circuit of the multilayer capacitor 2 (see FIG. 4) and acts to deter the capacitor from being rapidly charged and discharged, whereby the circuit is inhibited from speeding up as the ESL increases. When the inner electrodes 12A, 12B are provided with respective pluralities of openings 30A, 30B such as to form a mesh (net) as mentioned above, by contrast, the current flows in a dispersive manner through the inner electrodes 12A, 12B, thereby lowering the ESL. As a result, the impedance can be decreased over the whole high-frequency band as illustrated by the dash-single-dot line c1 in FIG. 3. This also makes the opposing area between the inner electrode 12A and its heteropole smaller as seen in the laminating direction, and the opposing area between the inner electrode 12B and its heteropole smaller as seen in the laminating direction. Therefore, the inner electrodes 12A, 12B are less susceptible to magnetic fluxes from their heteropoles, whereby the parasitic capacitance Cp (see FIG. 4) connected in parallel to the resistance component of the multilayer capacitor 2 becomes smaller. As a result, as illustrated by the solid line a in FIG. 3, the impedance can be inhibited from decreasing near the resonance frequency, whereby impedance fluctuations are suppressed over a broad bandwidth including the vicinity of the resonance frequency.

Though the inner electrodes 12A, 12B, 14A, 14B, 16A, 16B are laminated in the order of the inner electrodes 12A and 12B, 14A and 14B, 16A, 16B, 16A, 16B, 14A and 14B, and 12A and 12B alternately with the dielectric layers A11 to A17 in the second embodiment, the orders of the inner electrodes 16A, 16B are interchangeable. Hence, the inner electrodes 12A, 12B, 14A, 14B, 16A, 16B may be laminated in the order of the inner electrodes 12A and 12B, 14A and 14B, 16B, 16A, 16B, 16A, 14A and 14B, and 12A and 12B alternately with the dielectric layers A11 to A17.

Though the inner electrodes 14A, 14B are arranged on the dielectric layers A12, A17 in the second embodiment, one of the inner electrodes 14A, 14B may be arranged alone on any of the dielectric layers A12, A17. Here, for increasing the capacitance C (see FIG. 4) of the multilayer capacitor 2, the inner electrode 16B is arranged within the dielectric matrix 10 such as to neighbor the inner electrode 14A in the laminating direction in the case where only the inner electrode 14A is arranged on the dielectric layer A12, and the inner electrode 16A is arranged within the dielectric matrix 10 such as to neighbor the inner electrode 14B in the laminating direction in the case where only the inner electrode 14B is arranged on the dielectric layer A12, for example.

Though the inner electrodes 16A, 16B, 16A, 16B are arranged in a row in this order between the set of inner electrodes 14A, 14B arranged on the dielectric layer A12 and the set of inner electrodes 14A, 14B arranged on the dielectric layer A17, it will be sufficient if one of the inner electrodes 16A and 16B is positioned between the set of inner electrodes 14A, 14B arranged on the dielectric layer A12 and the set of inner electrodes 14A, 14B arranged on the dielectric layer A17.

The inner electrodes 16A, 16B and dielectric layers may have any numbers as desired.

Third Embodiment

Figure 14:
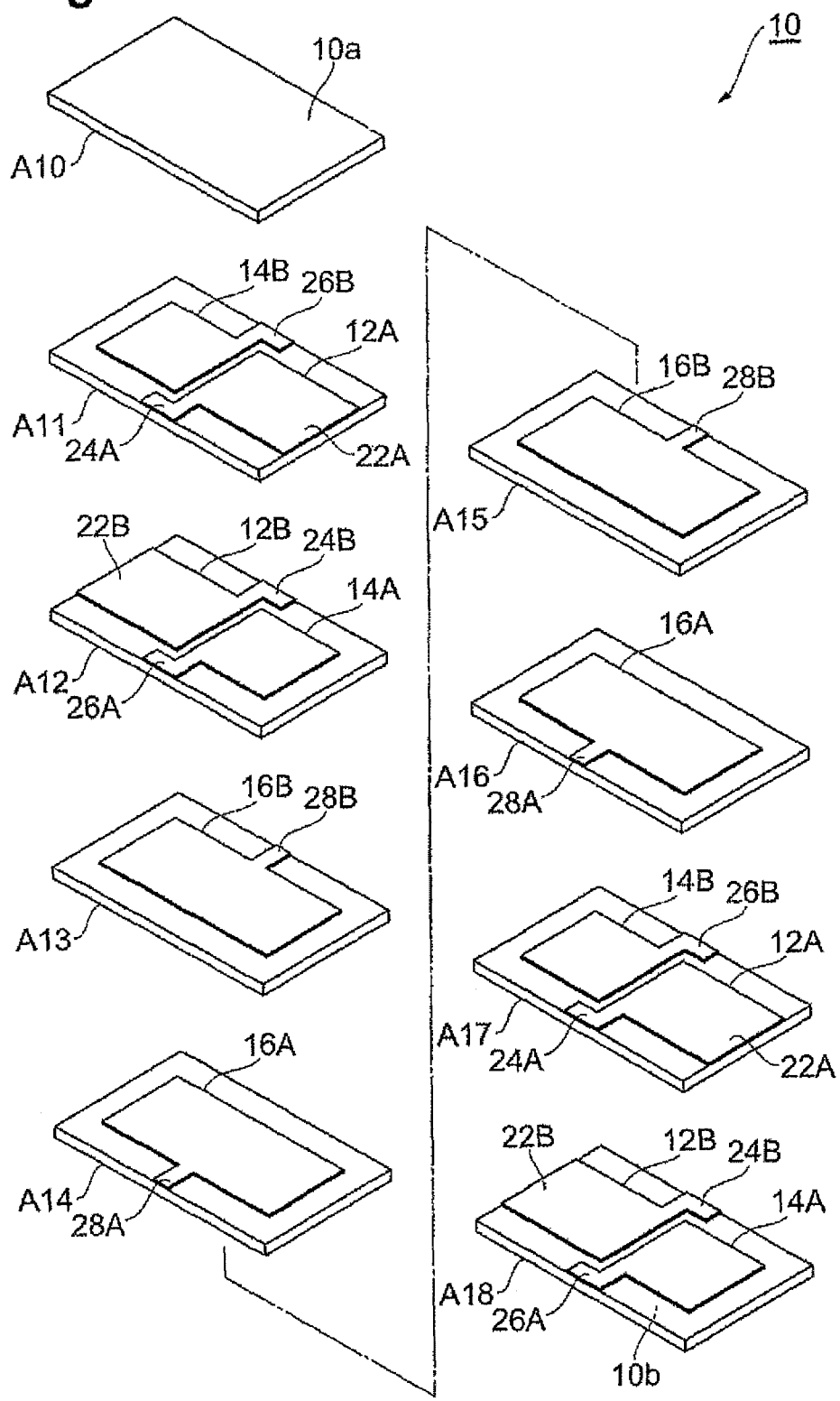
FIG. 14 is an exploded perspective view illustrating the multilayer capacitor in accordance with the third embodiment.

With reference to FIGS. 1 and 14, the structure of a multilayer capacitor 3 in accordance with the third embodiment will be explained. The multilayer capacitor 3 comprises a dielectric matrix (matrix) 10 having a rectangular parallelepiped form; inner electrodes 12A (second inner electrodes), 12B (first inner electrodes), 14A (fourth and eighth inner electrodes), 14B (fifth and seventh inner electrodes), 16A (sixth inner electrodes), and 16B (third inner electrodes); terminal electrodes 18A, 18B (first and second terminal electrodes); and linking electrodes 20A, 20B (first and second linking electrodes).

The dielectric matrix 10 has main faces 10a, 10b opposing each other, side faces 10c, 10d opposing each other, and side faces 10e, 10f opposing each other. In the third embodiment, the main face 10a or 10b is a mounting surface opposing the main face of a circuit board (not illustrated).

The side faces 10c, 10d extend so as to connect the main faces 10a, 10b and side faces 10e, 10f. The side faces 10e, 10f extend so as to connect the main faces 10a, 10b and side faces 10c, 10d. In the third embodiment, the length in the longitudinal direction, width, and thickness of the dielectric matrix 10 can be set to about 1.0 mm, about 0.5 mm, and about 0.5 mm, respectively, for example. Since the dielectric matrix 10 is typically barrel-polished after firing, ridge parts of the dielectric matrix 10 exhibit curved surfaces with a predetermined curvature (not illustrated).

As illustrated in FIG. 14, the dielectric matrix 10 is constructed by laminating dielectric layers A10 to A18, each having a rectangular form, in succession. Hence, the upper face of the dielectric layer A10 constitutes the main face 10a of the dielectric matrix 10, the lower face of the dielectric layer A18 constitutes the main face 10b of the dielectric matrix 10, and the opposing direction of the main faces 10a, 10b (hereinafter referred to as opposing direction) coincides with the laminating direction of the dielectric matrix 10 (dielectric layers A10 to A18) (hereinafter referred to as laminating direction) in the third embodiment.

The dielectric layers A10 to A18 function as insulators having an electric insulation property. The dielectric layers A10 to A18 can be formed by a dielectric ceramic material in which barium titanate or strontium titanate is doped with a rare-earth element, for example. In practice, the dielectric matrix 10 is integrated by firing to such an extent that boundaries between the dielectric layers A10 to A18 are indiscernible.

A pair of the inner electrodes 12A, 14B, each having a rectangular form, are formed on a surface of each of the dielectric layers A11, A17 while being separated from each other. The inner electrode 12A is arranged in a region of the dielectric layer A11, A17 located closer to the side face 10c (a region located closer to the side face 10c than is the center in the longitudinal direction of the dielectric layer A11, A17 in the third embodiment), while the inner electrode 14B is arranged in a region of the dielectric layer A11, A11 located closer to the side face 10d (a region located closer to the side face 10d than is the center in the longitudinal direction of the dielectric layer A11, A17 in the third embodiment).

The inner electrode 12A is integrally provided with a terminal connection part 22A (second terminal connection part) at a shorter side facing the side face 10c. The terminal connection part 22A has the same width as that of the inner electrode 12A and is drawn to an edge on a side of the dielectric layer A11, A11 formed with the terminal electrode 18A, so that an end portion thereof is exposed at the side face 10c. The inner electrode 12A is also integrally provided with a linking connection part 24A (second linking connection part) joined to a corner portion closer to the side faces 10d, 10e. The linking connection part 24A has a width sufficiently smaller than that of the inner electrode 12A and is drawn to an edge of the dielectric layer A11, A11 on a side formed with the linking electrode 20A, so that an end portion thereof is exposed at the side face 10e.

The inner electrode 14B is integrally provided with a linking connection part 26B (fifth linking connection part) joined to a corner portion closer to the side faces 10c, 10f. The linking connection part 26B has a width sufficiently smaller than that of the inner electrode 14B and is drawn to an edge of the dielectric layer A11, A11 on a side formed with the linking electrode 20B, so that an end portion thereof is exposed at the side face 10f.

A pair of the inner electrodes 12B, 14A, each having a rectangular form, are formed on a surface of each of the dielectric layers A12, A18 while being separated from each other. The inner electrode 12B is arranged in a region of the dielectric layer A12, A18 located closer to the side face 10d (a region located closer to the side face 10d than is the center in the longitudinal direction of the dielectric layer A12, A18 in the third embodiment), while the inner electrode 14A is arranged in a region of the dielectric layer A12, A18 located closer to the side face 10c (a region located closer to the side face 10c than is the center in the longitudinal direction of the dielectric layer A12, A18 in the third embodiment).

The inner electrode 12B is integrally provided with a terminal connection part 22B (first terminal connection part) at a shorter side facing the side face 10d. The terminal connection part 22B has the same width as that of the inner electrode 12B and is drawn to an edge on a side of the dielectric layer A12, A18 formed with the terminal electrode 18B, so that an end portion thereof is exposed at the side face 10d. The inner electrode 12B is also integrally provided with a linking connection part 24B (second linking connection part) joined to a corner portion closer to the side faces 10c, 10f. The linking connection part 24B has a width sufficiently smaller than that of the inner electrode 12B and is drawn to an edge of the dielectric layer A12, A18 on a side formed with the linking electrode 20B, so that an end portion thereof is exposed at the side face 10f.

The inner electrode 14A is integrally provided with a linking connection part 26A (fourth linking connection part) joined to a corner portion closer to the side faces 10d, 10e. The linking connection part 26A has a width sufficiently smaller than that of the inner electrode 14A and is drawn to an edge of the dielectric layer A12, A18 on a side formed with the linking electrode 20A, so that an end portion thereof is exposed at the side face 10e.

The inner electrode 16B having a rectangular shape is formed on a surface of each of the dielectric layers A13, A15. The inner electrode 16B extends in the opposing direction of the side faces 10c, 10d. The inner electrode 16B is integrally provided with a linking connection part 28B (third linking connection part) at a center portion of a longer side facing the side face 10f. The linking connection part 28B has a width sufficiently smaller than that of the inner electrode 16B and is drawn to an edge of the dielectric layer A13, A15 on a side formed with the linking electrode 20B, so that an end portion thereof is exposed at the side face 10f.

The inner electrode 16A having a rectangular shape is formed on a surface of each of the dielectric layers A14, A16. The inner electrode 16A extends in the opposing direction of the side faces 10c, 10d. The inner electrode 16A is integrally provided with a linking connection part 28A (sixth linking connection part) at a center portion of a longer side facing the side face 10e. The linking connection part 28A has a width sufficiently smaller than that of the inner electrode 16A and is drawn to an edge of the dielectric layer A14, A16 on a side formed with the linking electrode 20A, so that an end portion thereof is exposed at the side face 10e.

The inner electrodes 12A, 12B, 14A, 14B, 16A, 16B, each of which is arranged within the dielectric matrix 10, are laminated in the order of the inner electrodes 12A and 14B, 12B and 14A, 16B, 16A, 16B, 16A, 12A and 14B, and 12B and 14A. Hence, the inner electrodes 12A, 12B, 14A, 14B, 16A, 16B are arranged within the dielectric matrix 10, while those adjacent to each other in the laminating direction (opposing direction of the main faces 10a, 10b) are separated from each other by the thickness of their corresponding dielectric layers A11 to A18.

The inner electrodes 12A, 14A, 16A, 16B overlap one another as seen in the laminating direction. More specifically, the inner electrodes 12A, 14A, regions of the inner electrodes 16A which are located closer to the side face 10c than is the center in the longitudinal direction of the dielectric layers, and regions of the inner electrodes 16B which are located closer to the side face 10c than is the center in the longitudinal direction of the dielectric layers overlap one another as seen in the laminating direction.

The inner electrodes 12B, 14B, 16A, 16B overlap one another as seen in the laminating direction. More specifically, the inner electrodes 12B, 14B, regions of the inner electrodes 16A which are located closer to the side face 10d than is the center in the longitudinal direction of the dielectric layers, and regions of the inner electrodes 16B which are located closer to the side face 10d than is the center in the longitudinal direction of the dielectric layers overlap each other as seen in the laminating direction.

On the other hand, the inner electrodes 12A, 12B do not overlap each other as seen in the laminating direction. The inner electrodes 14A, 14B do not overlap each other as seen in the laminating direction.

Therefore, the capacitance of the multilayer capacitor 3 is defined by the opposing area of the inner electrodes 16A, 16B as seen in the laminating direction and the gap between the inner electrodes 16A, 16B (i.e., the thickness of the dielectric layers A13 to A15), the opposing area of the inner electrodes 14A, 16B as seen in the laminating direction and the gap between the inner electrodes 14A, 16B (i.e., the thickness of the dielectric layer A12), and the opposing area of the inner electrodes 14B, 16A as seen in the laminating direction and the gap between the inner electrodes 14B, 16A (i.e., the thickness of the dielectric layer A16).

The inner electrodes 12A, 12B, 14A, 14B, 16A, 16B are made of a conductive material such as Ag or Ni, for example. The inner electrodes 12A, 12B, 14A, 14B, 16A, 16B are constructed as sintered bodies of a conductive paste containing the above-mentioned conductive material.

The terminal electrode 18A is formed such as to cover the side face 10c of the dielectric matrix 10 and protrude onto the main faces 10a, 10b and side faces 10e, 10f adjacent to the side face 10c. Hence, the terminal electrode 18A is arranged on the side face 10c and portions of the main faces 10a, 10b and side faces 10e, 10f which are closer to the side face 10c. The terminal electrode 18A is connected physically and electrically to the terminal connection parts 22A each having an end portion exposed at the side face 10c. Therefore, the terminal electrode 18A is electrically connected to the inner electrodes 12A.

The terminal electrode 18B is formed such as to cover the side face 10d of the dielectric matrix 10 and protrude onto the main faces 10a, 10b and side faces 10e, 10f adjacent to the side face 10d. Hence, the terminal electrode 18B is arranged on the side face 10d and portions of the main faces 10a, 10b and side faces 10e, 10f which are closer to the side face 10d. The terminal electrode 18B is connected physically and electrically to the terminal connection parts 22B each having an end portion exposed at the side face 10d. Therefore, the terminal electrode 18B is electrically connected to the inner electrodes 12B.

The linking electrode 20A is shaped rectangular and formed such as to partly cover the side face 10e of the dielectric matrix 10 and protrude onto the main faces 10a, 10b adjacent to the side face 10e. Hence, the linking electrode 20A is arranged on the side face 10e and portions of the main faces 10a, 10b which are closer to the side face 10e. The linking electrode 20A is connected physically and electrically to the linking connection parts 24A, 26A, 28A having end portions exposed at the side face 10e. Therefore, the inner electrodes 12A, 14A, 16A are electrically connected together through the linking electrode 20A. That is, the inner electrodes 12A, 14A, 16A become homopolar.

The linking electrode 20B is shaped rectangular and formed such as to partly cover the side face 10f of the dielectric matrix 10 and protrude onto the main faces 10a, 10b adjacent to the side face 10f. Hence, the linking electrode 20B is arranged on the side face 10f and portions of the main faces 10a, 10b which are closer to the side face 10f. The linking electrode 20B is connected physically and electrically to the linking connection parts 24B, 26B, 28B having end portions exposed at the side face 10f. Therefore, the inner electrodes 12B, 14B, 16B are electrically connected together through the linking electrode 20B. That is, the inner electrodes 12B, 14B, 16B become homopolar.

The terminal electrodes 18A, 18B and linking electrodes 20A, 20B are formed by applying and burning a conductive paste containing a conductive metal powder and glass hit onto their corresponding outer surfaces of the dielectric matrix 10, for example. Plating layers may be formed on the terminal electrodes 18A, 18B and linking electrodes 20A, 20B when necessary.

In the foregoing third embodiment, the inner electrode 12A is integrally provided with the terminal connection part 22A connected to the terminal electrode 18A and the linking connection part 24A connected to the linking electrode 20A, the inner electrode 16A is integrally provided with the linking connection part 28A connected to the linking electrode 20A, and the inner electrodes 12A, 16A, which are homopolar with each other, are adjacent to each other through the dielectric layer A16 and overlap each other as seen in the laminating direction of a plurality of dielectric layers. Therefore, the inner electrode 12A in which the resistance component ESR (see FIG. 4) of the multilayer capacitor 3 occurs when a current flows does not oppose any heteropole (such as the inner electrode 16B on the dielectric layer A15) in a neighboring manner on the side adjacent to the inner electrode 16A on the dielectric layer A16, whereby the parasitic capacitance Cp (see FIG. 4) connected in parallel to the resistance component of the multilayer capacitor becomes smaller. Also, the inner electrode 12B is integrally provided with the terminal connection part 22B connected to the terminal electrode 18B and the linking connection part 24B connected to the linking electrode 20B, the inner electrode 16B is integrally provided with the linking connection part 28B connected to the linking electrode 20B, and the inner electrodes 12B, 16B, which are homopolar with each other, are adjacent to each other through the dielectric layer A12 and overlap each other as seen in the laminating direction of a plurality of dielectric layers. Therefore, the inner electrode 12B in which the resistance component ESR (see FIG. 4) of the multilayer capacitor 3 occurs when a current flows does not oppose any heteropole (such as the inner electrode 16A on the dielectric layer A14) in a neighboring manner on the side adjacent to the inner electrode 16A on the dielectric layer A16, whereby the parasitic capacitance Cp (see FIG. 4) connected in parallel to the resistance component of the multilayer capacitor becomes smaller. Further, the inner electrode 14A is integrally provided with the linking connection part 26A connected to the linking electrode 20A, and the inner electrodes 12A, 14A, which are homopolar with each other, are adjacent to each other through the dielectric layer A17 and overlap each other as seen in the laminating direction of a plurality of dielectric layers. Therefore, the inner electrode 12A in which the resistance component ESR (see FIG. 4) of the multilayer capacitor 3 occurs when a current flows does not oppose any heteropole in a neighboring manner on the side adjacent to the inner electrode 14A on the dielectric layer A18, whereby the parasitic capacitance Cp (see FIG. 4) connected in parallel to the resistance component of the multilayer capacitor becomes smaller. Furthermore, the inner electrode 14B is integrally provided with the linking connection part 26B connected to the linking electrode 20B, and the inner electrodes 12B, 14B, which are homopolar with each other, are adjacent to each other through the dielectric layer A11 and overlap each other as seen in the laminating direction of a plurality of dielectric layers. Therefore, the inner electrode 12B in which the resistance component ESR (see FIG. 4) of the multilayer capacitor 3 occurs when a current flows does not oppose any heteropole in a neighboring manner on the side adjacent to the inner electrode 14B on the dielectric layer A11, whereby the parasitic capacitance Cp (see FIG. 4) connected in parallel to the resistance component of the multilayer capacitor becomes smaller. As a result, as illustrated by the solid line in FIG. 3, the impedance can be inhibited from decreasing near the resonance frequency, whereby impedance fluctuations are suppressed over a broad bandwidth including the vicinity of the resonance frequency.

In the third embodiment, the inner electrode 12A is integrally provided with the terminal connection part 22A connected to the terminal electrode 18A and the linking connection part 24A connected to the linking electrode 20A, the inner electrode 14B is integrally provided with the linking connection part 26B connected to the linking electrode 20B, and a pair of the inner electrodes 12A, 14B are arranged on each of the dielectric layers A11, A17. The inner electrode 12B is integrally provided with the terminal connection part 22B connected to the terminal electrode 18B and the linking connection part 24B connected to the linking electrode 20B, the inner electrode 14A is integrally provided with the linking connection part 26A connected to the linking electrode 20A, and a pair of the inner electrodes 12B, 14A are arranged on each of the dielectric layers A12, A18. Therefore, the inner electrodes 12A, 14B, which are heteropolar to each other, are arranged on the same dielectric layer, while the inner electrodes 12B, 14A, which are heteropolar to each other, are arranged on the same dielectric layer. As a result, the number of laminations of dielectric layers constituting the matrix decreases, whereby the multilayer capacitor 3 can further be made smaller.

In the third embodiment, the inner electrode 14A is integrally provided with the linking connection part 26A connected to the linking electrode 20A, the inner electrode 16B is integrally provided with the linking connection part 28B connected to the linking electrode 20B, and the inner electrodes 14A, 16B, which are heteropolar to each other, overlap each other as seen in the laminating direction of a plurality of dielectric layers. Also, the inner electrode 14B is integrally provided with the linking connection part 26B connected to the linking electrode 20B, the inner electrode 16A is integrally provided with the linking connection part 28A connected to the linking electrode 20A, and the inner electrodes 14B, 16A, which are heteropolar to each other, overlap each other as seen in the laminating direction of a plurality of dielectric layers. Therefore, the capacity component C (see FIG. 4) of the multilayer capacitor 3 occurs between the inner electrodes 14A, 16B where the resistance component ESR (see FIG. 4) of the multilayer capacitor 3 is not generated when a current flows, and between the inner electrodes 14B, 16A where the resistance component ESR (see FIG. 4) of the multilayer capacitor 3 is not generated when a current flows. This, together with the fact that the inner electrodes 14A, 12B, which are heteropolar to each other, are arranged on the same dielectric layer A12, and the inner electrodes 14B, 12A, which are heteropolar to each other, are arranged on the same dielectric layer A17 as mentioned above, can increase the total capacitance of the multilayer capacitor 3 while making the multilayer capacitor 3 smaller. As a result, the impedance can be decreased over the whole low-frequency band as illustrated by the dash-double-dot line c2 in FIG. 3.

Though a preferred embodiment of the present invention is explained in detail in the foregoing, the present invention is not limited to the above-mentioned embodiment. For example, though two sets of inner electrodes 12A, 14B positioned on the same dielectric layers and two sets of inner electrodes 12B, 14A positioned on the same dielectric layers are arranged within the dielectric matrix 10, one set of inner electrodes 12A, 14B and one set of inner electrodes 12B, 14A may be arranged within the dielectric matrix 10 as illustrated in FIGS. 15 and 16 or three or more sets of inner electrodes 12A, 14B and three or more sets of inner electrodes 12B, 14A may be arranged therewithin (not illustrated).

Figure 16:
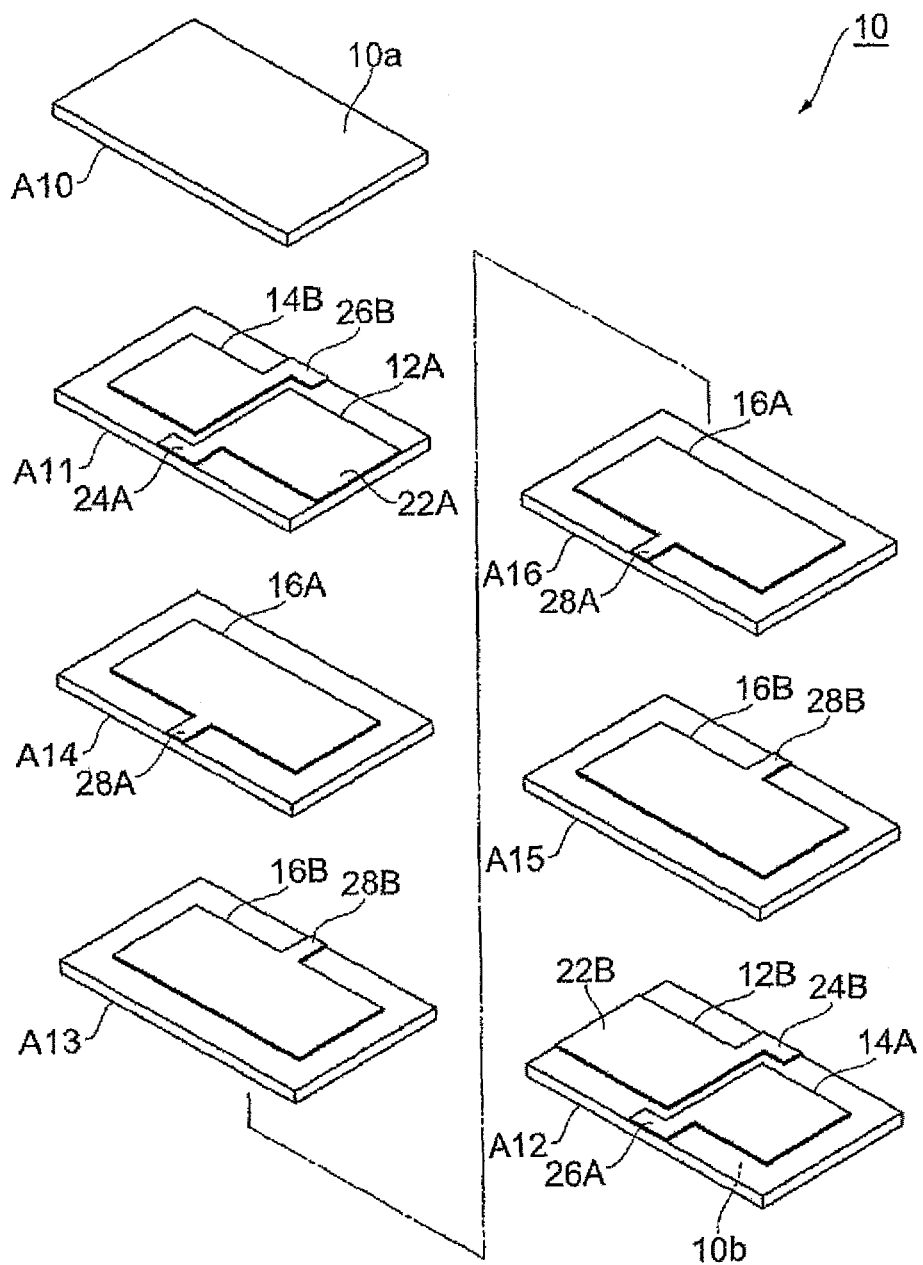
FIG. 16 is an exploded perspective view illustrating still another example (second example) of the dielectric matrix constituting the multilayer capacitor in accordance with the third embodiment.

As illustrated in FIG. 16, the inner electrodes 16A, 16B may be arranged between a set of the inner electrodes 12A, 14B and a set of the inner electrodes 12B, 14A.

Figure 15:
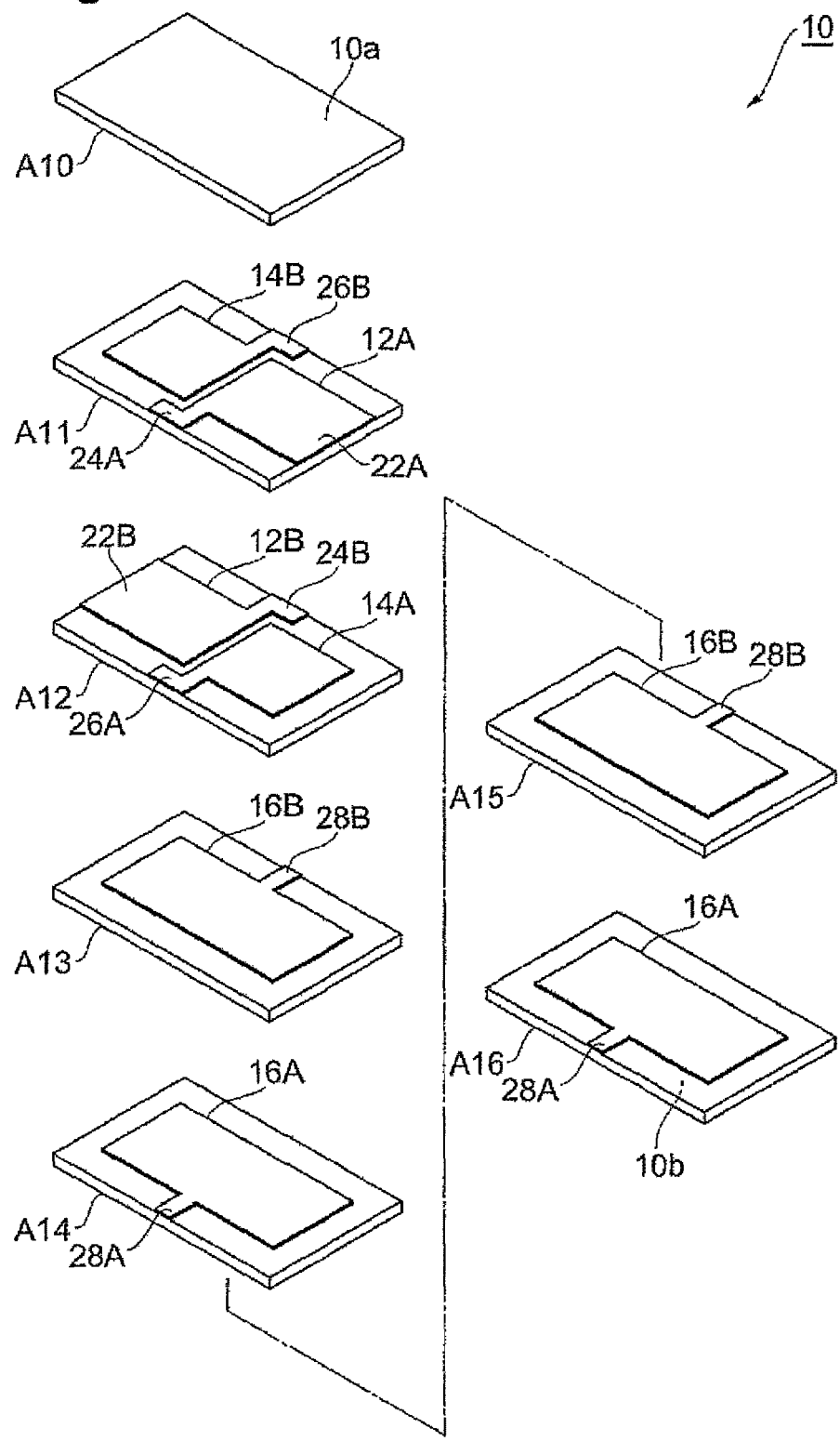
FIG. 15 is an exploded perspective view illustrating another example (first example) of the dielectric matrix constituting the multilayer capacitor in accordance with the third embodiment.

In FIG. 15, the dielectric matrix 10 is constructed by laminating dielectric layers A10 to A16 in succession, while the inner electrodes 12A, 12B, 14A, 14B, 16A, 16B are laminated within the dielectric matrix 10 in the order of the inner electrodes 12A and 14B, 12B and 14A, 16B, 16A, 16B, and 16A alternately with the dielectric layers A11 to A15. In FIG. 16, the dielectric matrix 10 is constructed by laminating dielectric layers A10, A11, A14, A13, A16, A15, A12 in succession, while the inner electrodes 12A, 12B, 14A, 14B, 16A, 16B are laminated within the dielectric matrix 10 in the order of the inner electrodes 12A and 14B, 16A, 16B, 16A, 16B, and 12B and 14A.

If the linear distance between the main face 10a and the inner electrode 12A differs from that between the main face 10b and the inner electrode 12B, a current flow path may vary according to whether the multilayer capacitor 3 is mounted to a circuit board by using the main face 10a or 10b as a mounting surface, whereby the high-frequency characteristic may change depending on the state in which the multilayer capacitor 3 is mounted to the circuit board. When the linear distance from the main face 10a to the inner electrode 12A is substantially the same as that from the main face 10b to the inner electrode 12B, i.e., the thickness of the dielectric layer A10 is substantially the same as that of the dielectric layer A12, as illustrated in FIG. 16, by contrast, there is hardly any fear of changing the high-frequency characteristic. Since the multilayer capacitor is an industrial product and may incur errors within a certain tolerance, "substantially the same" herein encompasses the sameness within the tolerance in the industrial product.

Figure 17:
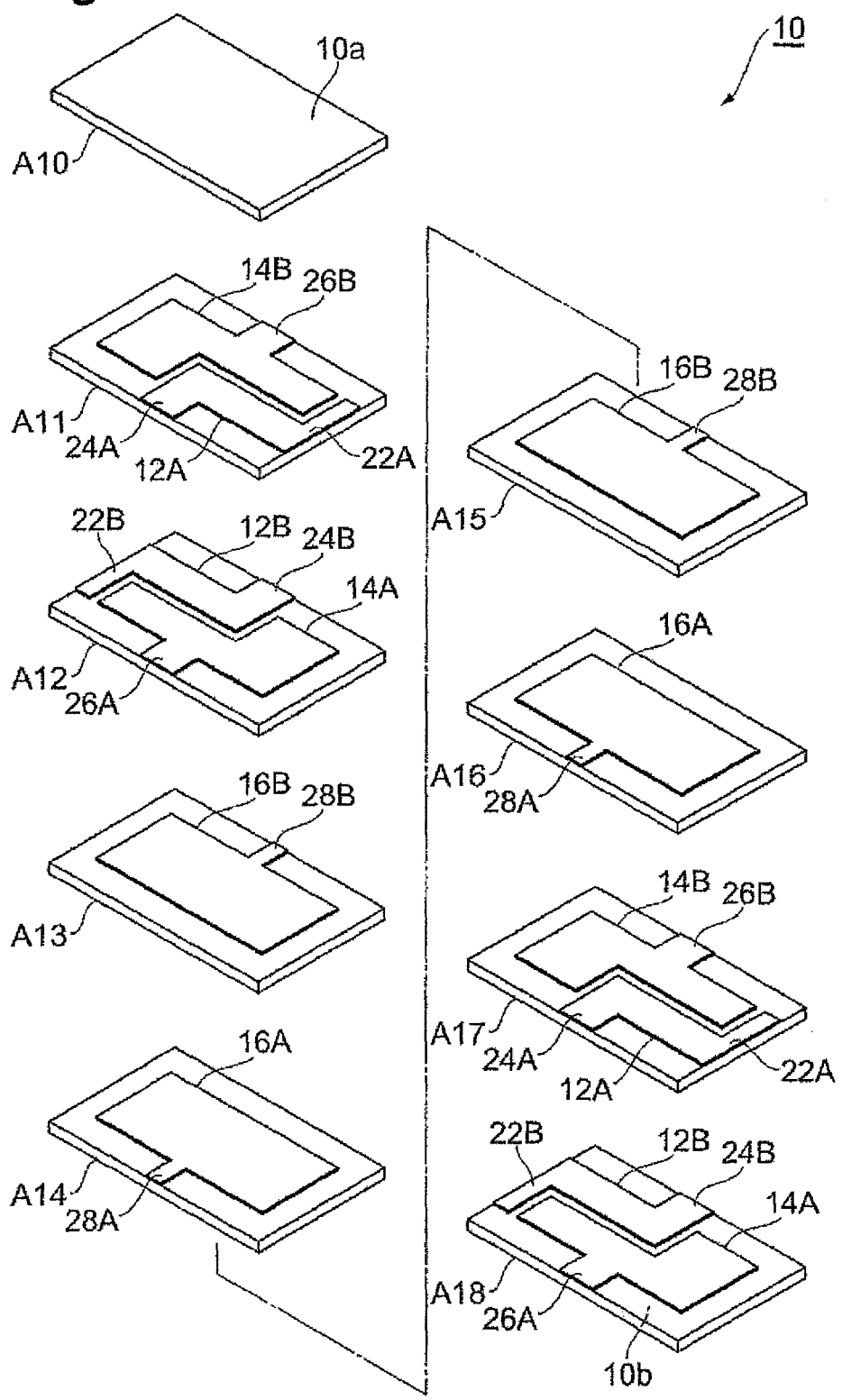
FIG. 17 is an exploded perspective view illustrating a further example (third example) of the dielectric matrix constituting the multilayer capacitor in accordance with the third embodiment.

The inner electrodes 12A, 12B, 14A, 14B can have various forms as illustrated in FIG. 17, for example, as a matter of course.

In FIG. 17, each of the inner electrodes 12A has a rectangular form and is arranged in a region located closer to the side face 10c than is the center in the longitudinal direction of the dielectric layer A11, A17 and closer to the side face 10e than is the center in the transverse direction of the dielectric layer A11, A17. Each of the inner electrodes 12B has a rectangular form and is arranged in a region located closer to the side face 10d than is the center in the longitudinal direction of the dielectric layer A12, A18 and closer to the side face 10f than is the center in the transverse direction of the dielectric layer A12, A18. Each of the inner electrodes 14A is shaped like letter L and arranged such as to extend over a region located closer to the side face 10c than is the center in the longitudinal direction of the dielectric layer A12, A18 and a region located closer to the side face 10e than is the center in the transverse direction of the dielectric layer A12, A18. Each of the inner electrodes 14B is shaped like letter L and arranged such as to extend over a region located closer to the side face 10d than is the center in the longitudinal direction of the dielectric layer A11, A17 and a region located closer to the side face 10f than is the center in the transverse direction of the dielectric layer A11, A17.

A portion of the inner electrode 14A positioned closer to the side face 10d than is the center in the longitudinal direction of the dielectric layer A12, A18 and closer to the side face 10e than is the center in the transverse direction of the dielectric layer A12, A18 overlaps a portion of the inner electrode 14B positioned closer to the side face 10d than is the center in the longitudinal direction of the dielectric layer A11, A17 and closer to the side face 10e than is the center in the transverse direction of the dielectric layer A11, A17 as seen in the laminating direction. A portion of the inner electrode 14A positioned closer to the side face 10c than is the center in the longitudinal direction of the dielectric layer A12, A18 and closer to the side face 10f than is the center in the transverse direction of the dielectric layer A12, A18 overlaps a portion of the inner electrode 14B positioned closer to the side face 10c than is the center in the longitudinal direction of the dielectric layer A11, A17 and closer to the side face 10f than is the center in the transverse direction of the dielectric layer A11, A17 as seen in the laminating direction. Therefore, when the inner electrodes 12A, 12B, 14A, 14B are shaped as illustrated in FIG. 17, a capacity component of the multilayer capacitor 3 occurs between the inner electrodes 14A, 14B as well. As a result, the total capacitance of the multilayer capacitor 3 can further be increased.

Figure 18:
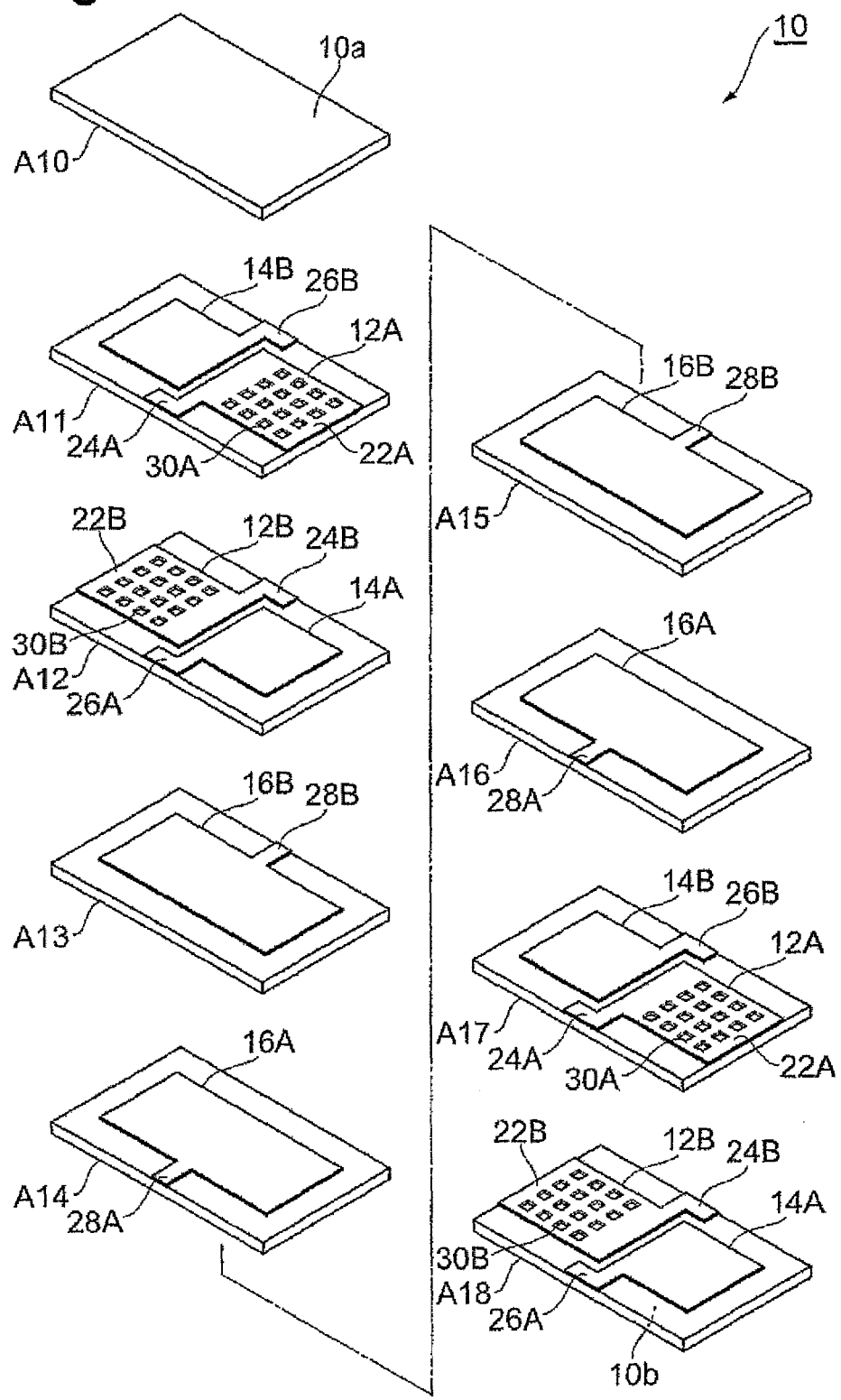
FIG. 18 is an exploded perspective view illustrating a still further example (fourth example) of the dielectric matrix constituting the multilayer capacitor in accordance with the third embodiment.

As illustrated in FIG. 18, each inner electrode 12A may be provided with a plurality of openings 30A each having a square form, while each inner electrode 12B may be provided with a plurality of openings 30B each having a square form. Each set of the openings 30A, 30B are arranged in a matrix of four by four, i.e., so as to form a mesh (net), in their corresponding inner electrode 12A, 12B. The openings 30A, 30B may have various forms such as polygonal (triangular, quadrangular, etc.), circular, elliptical, and elongated holes.

The inner electrodes 16A, 16B and dielectric layers may have any numbers as desired.

It is apparent that various embodiments and modifications of the present invention can be embodied, based on the above description. Accordingly, it is possible to carry out the present invention in modes other than the above best modes, within the following scope of claims and the scope of equivalents thereto.

What is claimed is:

1. A multilayer capacitor comprising:
a matrix constituted by a plurality of laminated dielectric layers having at least first to third dielectric layers;
first and second terminal electrodes arranged on an outer surface of the matrix;
first and second linking electrodes arranged on the outer surface of the matrix; and
first to fourth inner electrodes arranged within the matrix;
wherein the first, second, and third dielectric layers are laminated in succession;
wherein the first and second inner electrodes are arranged on the first dielectric layer while being separated from each other;
wherein the third inner electrode is arranged on the second dielectric layer;
wherein the fourth inner electrode is arranged on the third dielectric layer;
wherein the first inner electrode is integrally provided with a first terminal connection part connected to the first terminal electrode and a first linking connection part connected to the first linking electrode;
wherein the second inner electrode is integrally provided with a second terminal connection part connected to the second terminal electrode and a second linking connection part connected to the second linking electrode;
wherein the third inner electrode is integrally provided with a third linking connection part connected to the second linking electrode;
wherein the fourth inner electrode is integrally provided with a fourth linking connection part connected to the first linking electrode;

wherein the third inner electrode is adjacent to the second and fourth inner electrodes in a laminating direction of the plurality of dielectric layers;

wherein the first and third inner electrodes are kept from overlapping each other as seen in the laminating direction of the plurality of dielectric layers; and wherein the second, third, and fourth inner electrodes overlap one another as seen in the laminating direction of the plurality of dielectric layers.

2. The multilayer capacitor according to claim 1, further comprising a fifth inner electrode arranged within the matrix;

wherein the fifth inner electrode is arranged on the second dielectric layer while being separated from the third inner electrode;

wherein the fifth inner electrode is integrally provided with a fifth linking connection part connected to the first linking electrode;

wherein the fifth inner electrode is adjacent to the first and fourth inner electrodes in the laminating direction of the plurality of dielectric layers;

wherein the first and fifth inner electrodes overlap each other as seen in the laminating direction of the plurality of dielectric layers;

wherein the second and fifth inner electrodes are kept from overlapping each other as seen in the laminating direction of the plurality of dielectric layers; and wherein the fourth and fifth inner electrodes overlap each other as seen in the laminating direction of the plurality of dielectric layers.

3. The multilayer capacitor according to claim 2, further comprising sixth to tenth inner electrodes arranged within the matrix;

wherein the plurality of dielectric layers include fourth to sixth dielectric layers;

wherein the first, second, third, sixth, fourth, and fifth dielectric layers are laminated in succession;

wherein the matrix has a first main face positioned on the first dielectric layer side in the laminating direction of the plurality of dielectric layers and a second main face positioned on the fifth dielectric layer side in the laminating direction of the plurality of dielectric layers;

wherein the sixth and seventh inner electrodes are arranged on the fourth dielectric layer while being separated from each other;

wherein the eighth and ninth inner electrodes are arranged on the fifth dielectric layer while being separated from each other;

wherein the tenth inner electrode is arranged on the sixth dielectric layer;

wherein the sixth inner electrode is integrally provided with a sixth linking connection part connected to the first linking electrode;

wherein the seventh inner electrode is integrally provided with a seventh linking connection part connected to the second linking electrode;

wherein the eighth inner electrode is integrally provided with a third terminal connection part connected to the first terminal electrode and an eighth linking connection part connected to the first linking electrode;

wherein the ninth inner electrode is integrally provided with a fourth terminal connection part connected to the second terminal electrode and a ninth linking connection part connected to the second linking electrode;

wherein the tenth inner electrode is integrally provided with a tenth linking connection part connected to the second linking electrode;

wherein the sixth inner electrode is adjacent to the eighth and tenth inner electrodes in the laminating direction of the plurality of dielectric layers;

wherein the seventh inner electrode is adjacent to the ninth inner electrode in the laminating direction of the plurality of dielectric layers;

wherein the sixth, eighth, and tenth inner electrodes overlap one another as seen in the laminating direction of the plurality of dielectric layers;

wherein the sixth and ninth inner electrodes are kept from overlapping each other as seen in the laminating direction of the plurality of dielectric layers;

wherein the seventh and eighth inner electrodes are kept from overlapping each other as seen in the laminating direction of the plurality of dielectric layers;

wherein the seventh and ninth inner electrodes overlap each other as seen in the laminating direction of the plurality of dielectric layers; and wherein a linear distance from the first and second inner electrodes to the first main face in the laminating direction of the plurality of dielectric layers is substantially the same as that from the eighth and ninth inner electrodes to the second main face in the laminating direction of the plurality of dielectric layers.

4. The multilayer capacitor according to claim 2, further comprising sixth to ninth inner electrodes arranged within the matrix;

wherein the plurality of dielectric layers include fourth and fifth dielectric layers;

wherein the first, second, third, fourth, and fifth dielectric layers are laminated in succession;

wherein the matrix has a first main face positioned on the first dielectric layer side in the laminating direction of the plurality of dielectric layers and a second main face positioned on the fifth dielectric layer side in the laminating direction of the plurality of dielectric layers;

wherein the sixth and seventh inner electrodes are arranged on the fourth dielectric layer while being separated from each other;

wherein the eighth and ninth inner electrodes are arranged on the fifth dielectric layer while being separated from each other;

wherein the sixth inner electrode is integrally provided with a sixth linking connection part connected to the first linking electrode;

wherein the seventh inner electrode is integrally provided with a seventh linking connection part connected to the second linking electrode;

wherein the eighth inner electrode is integrally provided with a third terminal connection part connected to the first terminal electrode and an eighth linking connection part connected to the first linking electrode;

wherein the ninth inner electrode is integrally provided with a fourth terminal connection part connected to the second terminal electrode and a ninth linking connection part connected to the second linking electrode;

wherein the fourth inner electrode is adjacent to the seventh inner electrode in the laminating direction of the plurality of dielectric layers;

wherein the sixth inner electrode is adjacent to the eighth inner electrode in the laminating direction of the plurality of dielectric layers;

wherein the seventh inner electrode is adjacent to the ninth inner electrode in the laminating direction of the plurality of dielectric layers;

wherein the fourth, seventh, and ninth inner electrodes overlap one another as seen in the laminating direction of the plurality of dielectric layers;

wherein the sixth and eighth inner electrodes overlap each other as seen in the laminating direction of the plurality of dielectric layers;

wherein the sixth and ninth inner electrodes are kept from overlapping each other as seen in the laminating direction of the plurality of dielectric layers;

wherein the seventh and eighth inner electrodes are kept from overlapping each other as seen in the laminating direction of the plurality of dielectric layers; and wherein a linear distance from the first and second inner electrodes to the first main face in the laminating direction of the plurality of dielectric layers is substantially the same as that from the eighth and ninth inner electrodes to the second main face in the laminating direction of the plurality of dielectric layers.

5. The multilayer capacitor according to claim 2, wherein the matrix has a first main face positioned on the first dielectric layer side in the laminating direction of the plurality of dielectric layers and a second main face positioned on the third dielectric layer side in the laminating direction of the plurality of dielectric layers; and wherein a linear distance from the first and second inner electrodes to the first main face in the laminating direction of the plurality of dielectric layers is substantially the same as a linear distance from the first and second inner electrodes to the second main face in the laminating direction of the plurality of dielectric layers.

6. The multilayer capacitor according to claim 5, further comprising sixth and seventh inner electrodes arranged within the matrix;

wherein the plurality of dielectric layers include a fourth dielectric layer;

wherein the fourth, first, second, and third dielectric layers are laminated in succession;

wherein the sixth and seventh inner electrodes are arranged on the fourth dielectric layer while being separated from each other;

wherein the sixth inner electrode is integrally provided with a sixth linking connection part connected to the first linking electrode;

wherein the seventh inner electrode is integrally provided with a seventh linking connection part connected to the second linking electrode;

wherein the sixth inner electrode is adjacent to the first inner electrode in the laminating direction of the plurality of dielectric layers;

wherein the seventh inner electrode is adjacent to the second inner electrode in the laminating direction of the plurality of dielectric layers;

wherein the sixth and first inner electrodes overlap each other as seen in the laminating direction of the plurality of dielectric layers;

wherein the sixth and second inner electrodes are kept from overlapping each other as seen in the laminating direction of the plurality of dielectric layers;

wherein the seventh and first inner electrodes are kept from overlapping each other as seen in the laminating direction of the plurality of dielectric layers; and wherein the seventh and second inner electrodes overlap each other as seen in the laminating direction of the plurality of dielectric layers.

7. The multilayer capacitor according to claim 1, wherein the first inner electrode has a first terminal-side region located closer to the first terminal connection part than is a portion provided with the first linking connection part;

wherein the second inner electrode has a second terminal-side region located closer to the second terminal connection part than is a portion provided with the second linking connection part; and wherein each of the first and second terminal-side regions is provided with a plurality of openings.

8. The multilayer capacitor according to claim 7, wherein the plurality of openings are arranged such as to form a mesh.

9. A multilayer capacitor comprising:

a matrix constituted by a plurality of laminated dielectric layers having at least first to third dielectric layers;

first and second terminal electrodes arranged on an outer surface of the matrix;

first and second linking electrodes arranged on the outer surface of the matrix; and first to fifth inner electrodes arranged within the matrix;

wherein the first, second, and third dielectric layers are laminated in succession;

wherein the first and second inner electrodes are arranged on the first dielectric layer while being separated from each other;

wherein the third and fifth inner electrodes are arranged on the second dielectric layer while being separated from each other;

wherein the fourth inner electrode is arranged on the third dielectric layer;

wherein the first inner electrode is integrally provided with a first terminal connection part connected to the first terminal electrode and a first linking connection part connected to the first linking electrode;

wherein the second inner electrode is integrally provided with a second terminal connection part connected to the second terminal electrode and a second linking connection part connected to the second linking electrode;

wherein the third inner electrode is integrally provided with a third linking connection part connected to the second linking electrode;

wherein the fourth inner electrode is integrally provided with a fourth linking connection part connected to the first linking electrode;

wherein the fifth inner electrode is integrally provided with a fifth linking connection part connected to the first linking electrode;

wherein the first inner electrode is adjacent to the fifth inner electrode in a laminating direction of the plurality of dielectric layers;

wherein the third inner electrode is adjacent to the second and fourth inner electrodes in the laminating direction of the plurality of dielectric layers;

wherein the first and fifth inner electrodes overlap each other as seen in the laminating direction of the plurality of dielectric layers;

wherein the first and third inner electrodes are kept from overlapping each other as seen in the laminating direction of the plurality of dielectric layers;

wherein the second and fifth inner electrodes are kept from overlapping each other as seen in the laminating direction of the plurality of dielectric layers; and wherein the second, third, and fourth inner electrodes overlap one another as seen in the laminating direction of the plurality of dielectric layers.

10. The multilayer capacitor according to claim 9, further comprising sixth to tenth inner electrodes arranged within the matrix;

wherein the plurality of dielectric layers include fourth to sixth dielectric layers;
wherein the first, second, third, sixth, fourth, and fifth dielectric layers are laminated in succession;
wherein the matrix has a first main face positioned on the first dielectric layer side in the laminating direction of the plurality of dielectric layers and a second main face positioned on the fifth dielectric layer side in the laminating direction of the plurality of dielectric layers;
wherein the sixth and seventh inner electrodes are arranged on the fourth dielectric layer while being separated from each other;
wherein the eighth and ninth inner electrodes are arranged on the fifth dielectric layer while being separated from each other;
wherein the tenth inner electrode is arranged on the sixth dielectric layer;
wherein the sixth inner electrode is integrally provided with a sixth linking connection part connected to the first linking electrode;
wherein the seventh inner electrode is integrally provided with a seventh linking connection part connected to the second linking electrode;
wherein the eighth inner electrode is integrally provided with a third terminal connection part connected to the first terminal electrode and an eighth linking connection part connected to the first linking electrode;
wherein the ninth inner electrode is integrally provided with a fourth terminal connection part connected to the second terminal electrode and a ninth linking connection part connected to the second linking electrode;
wherein the tenth inner electrode is integrally provided with a tenth linking connection part connected to the second linking electrode;
wherein the sixth inner electrode is adjacent to the eighth and tenth inner electrodes in the laminating direction of the plurality of dielectric layers;
wherein the seventh inner electrode is adjacent to the ninth inner electrode in the laminating direction of the plurality of dielectric layers;
wherein the sixth, eighth, and tenth inner electrodes overlap one another as seen in the laminating direction of the plurality of dielectric layers;
wherein the sixth and ninth inner electrodes are kept from overlapping each other as seen in the laminating direction of the plurality of dielectric layers;
wherein the seventh and eighth inner electrodes are kept from overlapping each other as seen in the laminating direction of the plurality of dielectric layers;
wherein the seventh and ninth inner electrodes overlap each other as seen in the laminating direction of the plurality of dielectric layers; and
wherein a linear distance from the first and second inner electrodes to the first main face in the laminating direction of the plurality of dielectric layers is substantially the same as that from the eighth and ninth inner electrodes to the second main face in the laminating direction of the plurality of dielectric layers.

11. The multilayer capacitor according to claim 9, further comprising sixth to ninth inner electrodes arranged within the matrix;
wherein the plurality of dielectric layers include fourth and fifth dielectric layers;
wherein the first, second, third, fourth, and fifth dielectric layers are laminated in succession;
wherein the matrix has a first main face positioned on the first dielectric layer side in the laminating direction of the plurality of dielectric layers and a second main face positioned on the fifth dielectric layer side in the laminating direction of the plurality of dielectric layers;
wherein the sixth and seventh inner electrodes are arranged on the fourth dielectric layer while being separated from each other;
wherein the eighth and ninth inner electrodes are arranged on the fifth dielectric layer while being separated from each other;
wherein the sixth inner electrode is integrally provided with a sixth linking connection part connected to the first linking electrode;
wherein the seventh inner electrode is integrally provided with a seventh linking connection part connected to the second linking electrode;
wherein the eighth inner electrode is integrally provided with a third terminal connection part connected to the first terminal electrode and an eighth linking connection part connected to the first linking electrode;
wherein the ninth inner electrode is integrally provided with a fourth terminal connection part connected to the second terminal electrode and a ninth linking connection part connected to the second linking electrode;
wherein the fourth inner electrode is adjacent to the seventh inner electrode in the laminating direction of the plurality of dielectric layers;
wherein the sixth inner electrode is adjacent to the eighth inner electrode in the laminating direction of the plurality of dielectric layers;
wherein the seventh inner electrode is adjacent to the ninth inner electrode in the laminating direction of the plurality of dielectric layers;
wherein the fourth, seventh, and ninth inner electrodes overlap one another as seen in the laminating direction of the plurality of dielectric layers;
wherein the sixth and eighth inner electrodes overlap each other as seen in the laminating direction of the plurality of dielectric layers;
wherein the sixth and ninth inner electrodes are kept from overlapping each other as seen in the laminating direction of the plurality of dielectric layers;
wherein the seventh and eighth inner electrodes are kept from overlapping each other as seen in the laminating direction of the plurality of dielectric layers; and
wherein a linear distance from the first and second inner electrodes to the first main face in the laminating direction of the plurality of dielectric layers is substantially the same as that from the eighth and ninth inner electrodes to the second main face in the laminating direction of the plurality of dielectric layers.

12. The multilayer capacitor according to claim 9, wherein the matrix has a first main face positioned on the first dielectric layer side in the laminating direction of the plurality of dielectric layers and a second main face positioned on the third dielectric layer side in the laminating direction of the plurality of dielectric layers; and
wherein a linear distance from the first and second inner electrodes to the first main face in the laminating direction of the plurality of dielectric layers is substantially the same as a linear distance from the first and second inner electrodes to the second main face in the laminating direction of the plurality of dielectric layers.

13. The multilayer capacitor according to claim 9, further comprising sixth and seventh inner electrodes arranged within the matrix;
wherein the plurality of dielectric layers include a fourth dielectric layer;

wherein the fourth, first, second, and third dielectric layers are laminated in succession;

wherein the sixth and seventh inner electrodes are arranged on the fourth dielectric layer while being separated from each other;

wherein the sixth inner electrode is integrally provided with a sixth linking connection part connected to the first linking electrode;

wherein the seventh inner electrode is integrally provided with a seventh linking connection part connected to the second linking electrode;

wherein the sixth inner electrode is adjacent to the first inner electrode in the laminating direction of the plurality of dielectric layers;

wherein the seventh inner electrode is adjacent to the second inner electrode in the laminating direction of the plurality of dielectric layers;

wherein the sixth and first inner electrodes overlap each other as seen in the laminating direction of the plurality of dielectric layers;

wherein the sixth and second inner electrodes are kept from overlapping each other as seen in the laminating direction of the plurality of dielectric layers;

wherein the seventh and first inner electrodes are kept from overlapping each other as seen in the laminating direction of the plurality of dielectric layers; and wherein the seventh and second inner electrodes overlap each other as seen in the laminating direction of the plurality of dielectric layers.

\* \* \* \* \*